(12) United States Patent
Boudreau et al.

(10) Patent No.: US 10,470,137 B2
(45) Date of Patent: *Nov. 5, 2019

(54) POWER ALLOCATION FOR DEVICE-TO-DEVICE COMMUNICATION UNDERLAYING CELLULAR NETWORKS

(71) Applicant: Telefonaktiebolaget LM Ericsson (Publ), Stockholm (SE)

(72) Inventors: Gary Boudreau, Kanata (CA); Min Dong, Whitby (CA); Ben Liang, Whitby (CA); Ali Ramezanikebrya, Toronto (CA); Hossein Seyedmehdi, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 188 days.

This patent is subject to a terminal disclaimer.

(21) Appl. No.: 15/555,213

(22) PCT Filed: Mar. 9, 2016

(86) PCT No.: PCT/IB2016/051347
§ 371 (c)(1),
(2) Date: Sep. 1, 2017

(87) PCT Pub. No.: WO2016/142888
PCT Pub. Date: Sep. 15, 2016

(65) Prior Publication Data
US 2018/0077653 A1 Mar. 15, 2018

Related U.S. Application Data

(60) Provisional application No. 62/131,906, filed on Mar. 12, 2015, provisional application No. 62/186,912, filed on Jun. 30, 2015.

(51) Int. Cl.
*H04W 52/24* (2009.01)
*H04W 76/14* (2018.01)
(Continued)

(52) U.S. Cl.
CPC ........ *H04W 52/243* (2013.01); *H04B 7/0617* (2013.01); *H04W 52/26* (2013.01);
(Continued)

(58) Field of Classification Search
CPC ... H04W 52/243; H04W 76/14; H04W 52/26; H04W 72/085; H04W 88/06; H04W 4/70; H04B 7/0617
See application file for complete search history.

(56) References Cited

U.S. PATENT DOCUMENTS

2015/0110020 A1* 4/2015 Li ................. H04B 7/0617
370/329
2016/0128064 A1* 5/2016 Su ................. H04W 4/70
370/329

FOREIGN PATENT DOCUMENTS

WO 2014/101179 A1 7/2014

OTHER PUBLICATIONS

Huan Tang et al., Monotonic Optimizaiton for Power Control of D2D Underlay With Partial CSI, Electrical and Computer Engineering Department, University of California, 2016, 6 pages. (Year: 2016).*

(Continued)

*Primary Examiner* — Ian N Moore
*Assistant Examiner* — Latresa A McCallum
(74) *Attorney, Agent, or Firm* — Sage Patent Group

(57) ABSTRACT

A method and network node for configuring a device-to-device (D2D) pair and a cellular wireless device, the cellular wireless device configured to have a direct link with a serving network device of a network cell in which the
(Continued)

cellular wireless device resides. The method includes receiving Channel State Information (CSI) data for the D2D pair, a cellular wireless device, and at least one neighbor interference level, determining feasibility conditions for pairing the D2D pair and the cellular wireless device transmissions, determining a power allocation for the pairing of the D2D pair and cellular wireless device transmissions, the power allocation being based on a sum rate of the D2D pair and cellular wireless device transmissions, and configuring the D2D pair and cellular wireless device based at least in part on the determined power allocation.

21 Claims, 8 Drawing Sheets

(51) Int. Cl.
  *H04B 7/06* (2006.01)
  *H04W 52/26* (2009.01)
  *H04W 72/08* (2009.01)
  *H04W 88/06* (2009.01)
  *H04W 4/70* (2018.01)
(52) U.S. Cl.
  CPC ......... *H04W 72/085* (2013.01); *H04W 76/14* (2018.02); *H04W 88/06* (2013.01); *H04W 4/70* (2018.02)

(56) References Cited

OTHER PUBLICATIONS

International Search Report and Written Opinion dated Jun. 9, 2015 for International Application Serial No. PCT/IB2016/051347, International Filing Date Mar. 9, 2016, consisting of 13 pages.
Joint Resource Allocation for Device-to-Device Communications Underlaying Uplink MIMO Cellular Networks, IEEE Journal on Seleced Areas in Communications, IEEE Service Center, Piscataway, US, vol. 33, No. 1, Jan. 2015, pp. 41-54, consisting of 14 pages.
Resource Sharing Optimization for Device-to-Device Communication Underlaying Cellular Networks, IEEE Transactions on Wireless Communications, IEEE Service Center, Piscataway, NJ, US, vol. 10, No. 8, Aug. 2011, pp. 2752-2763, consisting of 12 pages.
Daohua Zhu et al. "Downlink Resource Reuse for Device-to-Device Communications Underlaying Cellular Networks," Published May 2014, IEEE Signal Processing Letters (vol. 21, No. 5) (pp. 531-534), consisting of 4-pages.
Daquan Feng et al. "Device-to-Device Communications Underlaying Cellular Networks," Published Aug. 2013, IEEE Transactions on Communications (vol. 61, No. 8) (pp. 3541-3551), consisting of 11-pages.
Rui Yin et al., "Joint Spectrum and Power Allocation for D2D Communications Underlaying Cellular Networks," Published Apr. 2015, Citation information: DOI 10.1109TVT.2015.2424395, IEEE Transactions on Vehicular Technology (pp. 1519-1532), consisting of 14-pages.
Feiran Wang et al. "Energy-Efficient Resource Allocation for Device-to-Device Underlay Communication," Published Apr. 2015, IEEE Transactions on Wireless Communications, (vol. 14, No. 4), consisting of 11-pages.
Rui Yin et al. "Pricing-Based Interference Coordination for D2D Communications in Cellular Networks", Published Mar. 2015, IEEE Transactions on Wireless Communications (vol. 14, No. 3), consisting of 14-pages.
Yong Li et al., "Coalitional Games for Resource Allocation in the Device-to-Device Uplink Underlaying Cellular Networks", Published Jul. 2014, IEEE Transactions on Wireless Communications (vol. 13, No. 7) (pp. 3965-3977) consisting of 13-pages.
Hualiang Chen et al. "Coalition Formation Game for Green Resource Management in D2D Communications,"Published Aug. 2014, IEEE Communications Letters (vol. 18, No. 8) (pp. 1395-1398) consisting of 4-pages.
Chen Xu et al. "Efficiency Resource Allocation for Device-to-Device Underlay Communication Systems: A Reverse Iterative Combinatorial Auction Based Approach," Published Sep. 2013, IEEE Journal on Selected Areas in Communications/Supplement (pp. 348-358), consisting of 11-pages.
Klaus Doppler et al. "Device-to-Device Communication as an Underlay to LTE-Advanced Networks", Published Dec. 2009, IEEE Communications Magazine—Topics in Radio Communications (pp. 42-49), consisting of 8-pages.
Gabor Fodor et al., "Design Aspects of Network Assisted Device-to-Device Communications", Published Mar. 2012, IEEE Communications Magazine—Accepted From Open Call (pp. 170-177), consisting of 8-pages.
Hyunkee Min, et al. "Capacity Enhancement Using an Interference Limited Area for Device-to-Device Uplink Underlaying Cellular Networks" Published Dec. 2011, IEEE Transactions on Wireless Communications (vol. 10, No. 12) (pp. 3995-4000), consisting of 6-pages.
Ali Ramezani-Kebrya et al., "Optimal Power Allocation in Device-to-Device Communication with SIMO Uplink Beamforming," Published Jun. 2015, IEEE International Workshop on Signal Processing Advances in Wireless Communications (SPAWC), (pp. 425-429), consisting of 5-pages.
Xingqin Lin et al., "An Overview of 3GPP Device-to-Device Proximity Services," Published Apr. 2014, IEEE Communications Magazine—Smart-Device-To-Smart-Device Communications (pp. 40-48), consisting of 9-pages.
Wei Zhong et al, "Joint Resource Allocation for Device-to-Device Communications Underlaying Uplink MIMO Cellular Networks", Published Jan. 2015, IEEE Journal on Selected Areas in Communications (vol. 33, No. 1) (pp. 41-54), consisting of 14-pages).
Chia-Hao Yu et al., "Resource Sharing Optimization for Device-to-Device Communication Underlaying Cellular Networks," Published Aug. 2011 (vol. 10, No. 8) (pp. 2752-2763), consisting of 12-pages.
International Search Report and Written Opinion issued by the International Searching Authority dated Jun. 9, 2016 in corresponding PCT Application Serial No. PCT/IB2016/051347, consisting of 12-pages.
Stephen Boyd, Lieven Vandenberghe "Convex Optimization," Published 2004, Cambridge University Press, consisting of 11-pages.

\* cited by examiner

POWER ALLOCATION FOR DEVICE-TO-DEVICE COMMUNICATION UNDERLAYING CELLULAR NETWORKS

CROSS-REFERENCE TO RELATED APPLICATIONS

This application is a Submission Under 35 U.S.C. § 371 for U.S. National Stage Patent Application of International Application Number: PCT/IB2016/051347, filed Mar. 9, 2016 entitled "POWER ALLOCATION FOR DEVICE-TO-DETECT COMMUNICATION UNDERLAYING CELLULAR NETWORKS,"which claims priority to U.S. Provisional Application No.: 62/131906, filed Mar. 12, 2015, entitled "DEVICE-TO-DEVICE COMMUNICATION WITH SIMO BEAMFORMING "and 62/186912, filed Jun. 30, 2015entitled "RESOURCE ALLOCATION FOR DEVICE-TO-DEVICE COMMUNTICATION"the entirety of all of which are incorporated herein by reference.

TECHNICAL FIELD

The disclosure relates to Device-to-Device (D2D) operation, D2D communication, network coverage, co-existence, radio emissions and interference mitigation, and in particular to optimizing the capacity of D2D underlays on legacy cellular networks with simultaneous D2D and legacy cellular wireless device transmissions.

BACKGROUND

In order to achieve high data rates, several technologies including Evolved Universal Mobile Telecommunications System (UMTS) terrestrial radio access (EUTRA) and EUTRA network (EUTRAN) have been developed in the Third Generation Partnership Project (3GPP) Long Term Evolution (LTE). Furthermore, local service requirements have led to the development of newer technologies in LTE-Advanced and are being proposed for "5G" implementations.

In order to provide local services, one approach is to use license exempt spectrum of wireless local area networks (WLANs). Another approach is data transmission on a licensed band in a coordinated and planned network. Toward this second approach, device-to-device (D2D) communication has been studied extensively, where nearby users can transmit data directly to each other with reused cellular resource blocks. Due to its local communication nature, D2D communication can be provided with smaller fees compared to the fees for cellular communication. D2D communication provides many benefits that cannot be provided by uncoordinated communication.

Some advantages of using D2D communication are summarized as follows:
  The overall network spectral efficiency can be improved significantly with an optimal configuration;
  Low delay and low power consumption due to the proximity of users;
  Improving radio resource utilization because of resource reuse by both cellular users and D2D pairs simultaneously;
  Using one link for direct communication, instead of one uplink and one downlink for communication through the base station, reduces resource usage; and
  Offloading cellular traffic to D2D traffic reduces congestion in the backhaul network, benefiting cellular existing users in the network.

There are many current and prospective applications for D2D communications. For example, D2D has been used in LTE-based public safety networks in the United States for its security and reliability. In addition, D2D communication is necessary for scenarios where the cellular transmission is not accessible.

In commercial networks, many social network applications require recognition of nearby users. Proximity user recognition is usually handled in a centralized manner, where users are required to register their location information in a server such that the location information can be shared among the other users, e.g., in the FACEBOOK. With D2D, location registration is no longer required for the purpose of proximity discovery. Another prospective application for D2D communication is E-commerce, where nearby agencies need to transfer efficiently a large amount of private data.

One challenge of D2D communication is interference to the coexisting cellular users. For a D2D underlying cellular network, interference needs to be carefully controlled because cellular users and D2D users share the spectrum. In order to manage the interference to the cellular users in the same cell, several approaches have been proposed such as limiting D2D transmission power, employing a fixed booster factor and a back-off factor to adjust D2D power. An interference limited area has been proposed, where D2D users can share the resources of those cellular users located out of the area.

In practical multi-cell networks, inter-cell interference (ICI) is a challenge that has not been addressed in the D2D literature. The ICI depends on the duplexing scheme used by cellular and D2D users and the resources blocks shared between D2D and cellular users. It is important to set the cellular user and D2D powers in an intelligent manner such that the ICI in the neighboring cell does not exceed some required upper limit.

However, the existing solutions are not without problems. Relay beamforming is a simple and efficient technique in order to take advantage of spatial diversity provided by multiple antenna receivers. The state-of-the-art algorithm to find the optimum D2D and cellular user powers is designed for a single-antenna. With receiver beamforming, the received SINR can be improved significantly at the BS resulting in overall spectral efficiency improvement. D2D communication could cause large ICI in the neighboring cells. There is no power allocation algorithm described in the literature to limit ICI caused by the users in the desired cell to users in adjacent cells. The current known algorithms are not designed to:
  Use a multi-antenna BS with optimal beamforming vector to improve SINR of the cellular user; and
  Maximize the sum rate of the cellular user and D2D with a limit on the maximum ICI generated in the neighboring cell.

The D2D communication may be bi-directional communication where both devices receive and transmit in the same or different resources. However D2D communication scenario may also comprise that of one of the devices transmits and the other one receives the signals. There may also exist a point-to-multipoint (e.g. multicast, broadcast) scenario in which case a plurality of devices receive signals from the same transmitting device. This scenario is particularly useful for emergency services or public safety operation to spread vital information to several devices in an affected area. The term D2D communication and D2D operation are interchangeably used.

Typically, devices operate under the supervision of radio access network with radio access nodes (e.g. base station). But in some scenarios the devices themselves establish direct communication constituting the radio access network without the intervention of the network infrastructure In cellular network assisted device-to-device communications (or simply network assisted D2D communications), cellular wireless devices in the vicinity of each other can establish a direct radio link (D2D bearer). While cellular wireless devices communicate over the D2D "direct" bearer, they also maintain a cellular connection with their respective serving base station, such as an enhanced Node B (eNB). This direct link is interchangeably called as network (NW) link, D2D-NW link etc. The NW link is used for example resource assignment for D2D communication, maintenance of radio link quality of D2D communication link etc.

As such D2D communication is a promising feature that can potentially scale the capacity of the network. In a D2D communication scenario, two cellular wireless devices (for example, UEs) directly communicate with each other without having the payload traversed through the backhaul network.

Three example coverage scenarios for D2D communication have been defined.

In Coverage

In this coverage scenario, all communicating D2D cellular wireless devices 14 are within the network coverage. In this scenario, the D2D cellular wireless devices can receive signals from and/or transmit signals to at least one network node such as the base station 12. In this case, the D2D cellular wireless device can maintain a communication link with the network. The network in turn can ensure that the D2D communication does not cause unnecessary interference. In coverage is also interchangeably referred to as in-network (IN) coverage.

Out of Coverage

In this scenario, D2D cellular wireless devices communicating with each other are not under network node coverage. In this scenario the D2D cellular wireless devices cannot receive signals from and/or transmit signals to any of the network nodes. Typically the lack of coverage is due to complete absence of the network coverage in the vicinity of the D2D cellular wireless devices. However the lack of coverage may also due to insufficient resources in the network nodes to serve or manage the D2D cellular wireless devices. Therefore in this scenario the network cannot provide any assistance to the D2D cellular wireless devices. The out of coverage is also interchangeably referred to as out-of-network (OON) coverage.

Partial Coverage

In this scenario at least one communicating D2D cellular wireless device is within network coverage, and at least one other D2D cellular wireless device is not under network coverage, but is communicating with a D2D cellular wireless device that is under network coverage. As mentioned above, the D2D cellular wireless device not being under network coverage can be due to lack of any network node in its vicinity or due to insufficient resources in any of the network nodes in its vicinity. The partial coverage is also interchangeably called partial-network (PN) coverage.

Establishing direct communication between two nodes, or even among a set of nearby nodes in Long Term Evolution (LTE) networks, is a promising way to enhance the spectral efficiency of the cellular network. Achieving potential improvements of Device-to-Device (D2D) communication depends on efficiently addressing the resource and power allocation problems. However, proposed solutions to these problems are immature. In a realistic cellular environment, there are multiple cellular devices and D2D pairs that attempt to access a shared resource pool. Normally each node has access to multiple Resource Blocks (RBs) and also each RB is allocated to multiple interfering devices between cells, i.e., resource reuse among neighboring cells. Furthermore, either uplink or downlink resources can be used for D2D communication. Any realistic D2D resource allocation formulation should consider the aforementioned factors. No existing work has addressed all of these factors. Studies in the literature propose simple heuristics that give highly sub-optimal performance, while the available optimal solutions are only achieved under simplified cellular communication models.

D2D communication can cause large ICI in the neighboring cells. The current algorithms available in the literature are not designed to maximize the combined sum rate of the cellular and D2D devices with a limit on the maximum ICI generated in the neighboring cell.

The D2D communication may be bi-directional communication where both devices receive and transmit in the same or different resources. However D2D communication may also comprise scenarios in which one of the devices transmits and the other one receives the signals. There may also exist a point-to-multipoint, e.g. multicast, broadcast, scenario in which case a plurality of devices receive signals from the same transmitting device. This scenario is particularly useful for emergency services or public safety operation to spread vital information to several devices in an affected area. The term D2D communication and D2D operation are interchangeably used herein.

Typically, devices operate under the supervision of a radio access network with radio access nodes, e.g., base stations. However, in some scenarios the devices themselves establish direct communication constituting the radio access network without the intervention of the network infrastructure.

Known studies propose simple heuristic methods that give highly sub-optimal performance, while the available optimal solutions are achieved under simplified cellular communication models. For example, in one known arrangement, an optimal resource allocation solution is provided for D2D devices underlying cellular devices in downlink transmission without imposing any constraint on the D2D power. In another known arrangement, a sub-optimal resource allocation solution is provided for D2D devices underlying cellular users in uplink transmission by dividing the original problem into three sub-problems and solving them separately. In another known arrangement, an assumption is made that each D2D pair has access to all RBs in its cell, without matching them with a specific cellular device. Further, some known proposed methods only consider a single-RB scenario or only consider a single-cell scenario. Some known proposed methods attempt to compute the power allocation for a D2D device and the corresponding cellular device at the same time. There are also known arrangements that use game theory approaches for resource allocation. These known works propose methods that do not ensure that any network related metric will be optimized.

SUMMARY

The present embodiments advantageously provide a method and network device for configuring a D2D pair and a cellular wireless device. According to one aspect, a method for configuring a D2D pair and a cellular wireless device is provided. The cellular wireless device is configured to have a direct link with a serving network device of a network cell in which the cellular wireless device resides. The method includes receiving Channel State Information (CSI) data for the D2D pair, the cellular wireless device, and at least one neighbor interference level, determining feasibility conditions for pairing the D2D pair and the cellular wireless device transmissions, determining a power allocation for the pairing of the D2D pair and cellular wireless device transmissions, the power allocation being based on a sum rate of the D2D pair and cellular wireless device transmissions, and configuring the D2D pair and cellular wireless device based at least in part on the determined power allocation.

According to this aspect, in some embodiments, the method further includes determining a plurality of beam vectors at the D2D pair. In some embodiments, determining the power allocation for the pairing of the D2D pair and cellular wireless device transmissions includes determining a transmission power (Pc) for the cellular wireless device and a transmission power (Pd) for the D2D pair.

In some embodiments, the CSI data includes information corresponding to at least one of: a channel response between the D2D pair; a channel response between the cellular wireless device and the network device; an interference channel between a D2D transmitter and the network device; an interference channel between the cellular wireless device and a receiving device of the D2D pair; an inter-cell interference (ICI) channel between the D2D pair and a neighbor base station; and an ICI channel between the cellular wireless device and the neighbor base station.

In some embodiments, determining the feasibility conditions for pairing the D2D pair and the cellular wireless device transmissions includes determining whether a predetermined criteria are met when sharing the same Physical Resource Blocks (PRBs) between the cellular wireless device and the D2D pair. In some embodiments, the predetermined criteria includes predefined Signal-to-Noise Ratio (SINR) thresholds for the D2D pair and the cellular wireless device, and at least one predefined ICI channel threshold.

In some embodiments, if it is determined that the feasibility conditions for pairing the D2D pair and the cellular wireless device transmissions are not met, the method further includes calculating an acceptable level of power over each resource block (RB) to meet a pre-specified signal to noise-plus-interference ratio (SINR) at an interfering cellular wireless device in one of a main cell and a neighboring cell determining D2D data transmission rates between the D2D pair subject to the calculated acceptable level of power over each RB to meet the pre-specified SINR, and selecting a pairing of shared RBs between the D2D pair and the interfering wireless cellular device whose RBs are to be shared with the D2D pair based on the determined D2D data transmission rates.

In some embodiments, determining the D2D data transmission rates is based on an estimate of a channel of the D2D pair. In some embodiments, the method further includes determining a sum of achievable data rates of the cellular wireless device and the D2D pair. In some embodiments, calculating the acceptable level of power to meet the pre-specified SINR includes constraining a sum of transmission powers of the D2D pair to be less than a maximum power level. In some embodiments, the method further includes iteratively searching for a D2D pair and cellular wireless device pairing that satisfies the feasibility conditions.

According to another aspect, a network device for configuring a D2D pair and a cellular wireless device is provided. The cellular wireless device is configured to have a direct link with a serving network device of a network cell in which the cellular wireless device resides. The network device includes a receiver configured to receive CSI data for the D2D pair, the cellular wireless device, and at least one neighbor interference level. The network device includes processing circuitry having a memory, a processor, the memory in communication with the processor. The memory has instructions that, when executed by the processor, configure the processor to determine feasibility conditions for pairing the D2D pair and the cellular wireless device transmissions, determine a power allocation for the pairing of the D2D pair and cellular wireless device transmissions, the power allocation based on a sum rate of the D2D pair and cellular wireless device transmissions, and configure the D2D pair and cellular wireless device based at least in part on the determined power allocation.

In some embodiments, the processor further configured to determine a plurality of beam vectors. In some embodiments, determining the power allocation for the pairing of the D2D pair and cellular wireless device transmissions includes determining a transmission power (Pc) for the cellular wireless device and a transmission power (Pd) for the D2D pair.

In some embodiments, the CSI data includes information corresponding to at least one of: a channel response between the D2D pair; a channel response between the cellular wireless device and the network device; an interference channel between a D2D transmitter and the network device; an interference channel between the cellular wireless device and a receiving device of the D2D pair; an ICI channel between the D2D pair and a neighbor base station; and an ICI channel between the cellular wireless device and the neighbor base station.

In some embodiments, determining the feasibility conditions for pairing the D2D pair and the cellular wireless device transmissions includes determining whether a predetermined criteria is met when sharing the same PRBs between the cellular wireless device and the D2D pair.

In some embodiments, the predetermined criteria include predefined SINR thresholds for the D2D pair and cellular wireless device, and at least one predefined ICI channel threshold. In some embodiments, if it is determined that the feasibility conditions for pairing the D2D pair and the cellular wireless device transmissions are not met, the memory has further instructions that, when executed by the processor, configure the processor to calculate an acceptable level of power over each RB to meet a pre-specified SINR at an interfering cellular wireless device in one of a main cell and a neighboring cell, determining D2D data transmission rates between the D2D pair subject to the calculated maximum acceptable level of power over each RB to meet the pre-specified SINR, and select a pairing of shared RBs between the D2D pair the interfering cellular wireless device whose RBs are to be shared with the D2D pair based on determined D2D data transmission rates.

In some embodiments, determining the D2D data transmission rates is based on an estimate of a channel of the D2D pair. In some embodiments, the memory has further instructions that, when executed by the processor, configure the processor to determine a sum of achievable data rates of the cellular wireless device and the D2D pair. In some embodiments, calculating the acceptable level of power to meet the pre-specified SINR includes constraining a sum of transmission powers of the D2D pair to be less than a maximum power level. In some embodiments, the memory has further instructions that, when executed by the processor, configure the processor to iteratively search for a D2D pair and cellular wireless device pairing that satisfies the feasibility conditions.

According to another aspect, a network device for configuring a D2D pair and a cellular wireless device is provided. The cellular wireless device is configured to have a direct link with a serving network device of a network cell in which the cellular wireless device resides. The network device includes: a receiver module configured to receive CSI data for the D2D pair, the cellular wireless device, and at least one neighbor interference level; a feasibility condition determination module configured to determine feasibility conditions for pairing the D2D pair and the cellular wireless device transmissions; a power allocation module configured to determine a power allocation for the pairing of the D2D pair and cellular wireless device transmissions, the power allocation based on a sum rate of the D2D pair and cellular wireless device transmissions; and a configuration module configured to configure the D2D pair and cellular wireless device based at least in part on the determined power allocation.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
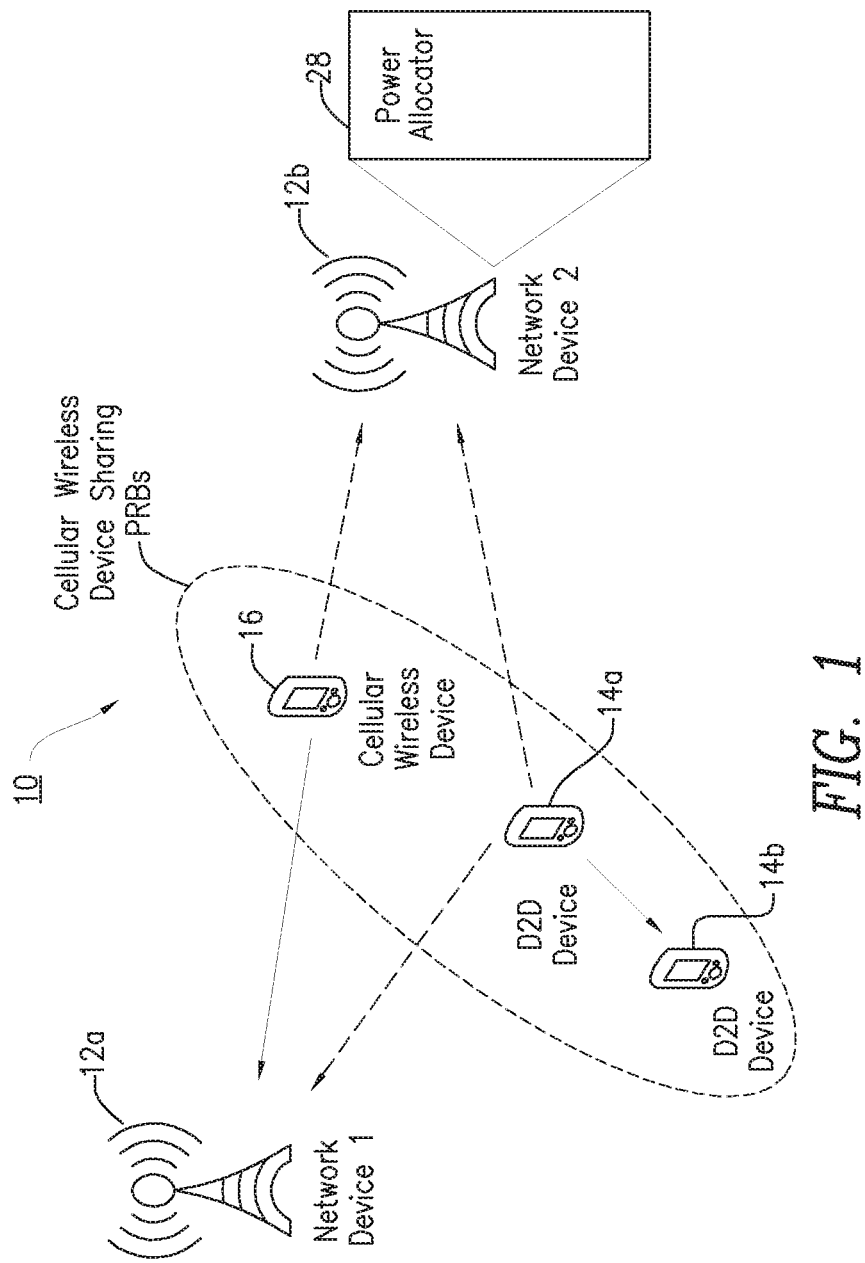
FIG. 1 is a block diagram of a wireless network supporting D2D communications and incorporating the power allocator of the present disclosure.

The disclosure provides one or more embodiments. In one embodiment, the following method is described: a method to increase the throughput of a D2D device and a legacy cellular or wireless access network (WAN) device sharing the same physical resource blocks (PRBs) within the same cell as compared with known methods. Specifically, the method determines the sum rate under power and interference constraints, as well as defined Quality of Service (QoS) requirements.

This disclosure also provides a method and arrangement for, as compared with known arrangements, efficiently scheduling a D2D device on resource blocks (RBs) of existing cellular devices in a network that is scheduling both cellular and D2D devices. This enables improvement in spectral efficiency over networks that merely schedule D2D and cellular devices on orthogonal resources.

For example, the disclosure provides for configuring a D2D and a cellular wireless device. Information such as Channel State Information (CSI) data for the D2D pair, the cellular wireless device, and at least one neighbor interference level is received. Feasibility conditions for pairing the D2D pair and the cellular wireless device transmissions are determined. A power allocation for the pairing of the D2D pair and cellular wireless device transmissions is determined in which the power allocation is based on a sum rate of the D2D pair and cellular wireless device transmissions. The D2D pair and cellular wireless device are configured based at least in part on the determined power allocation. In one embodiment, configuring the D2D pair and the cellular wireless device based at least in part on the determined power allocation includes scheduling the D2D pair on RBs of existing cellular wireless devices in a network that is scheduling both cellular and D2D devices.

The present disclosure is applicable to a multi-antenna network device such as a base station which schedules one cellular wireless device cellular wireless device and a D2D pair on the same PRBs. The powers of the cellular wireless device and D2D transmitter can be determined such that the overall sum rate is determined and in some embodiments, maximized (i.e., total or aggregate throughput), and the ICI caused in the neighboring cell is limited. Receive beamforming is used in the network device to take advantage of the spatial diversity.

In one embodiment, the step performed in a base station (BS) capable network device that includes obtaining one or more channel specific parameters for use by the cellular wireless device and D2D transmitter for communication with the network device and D2D receiver, respectively. Coverage scenarios, discussed in further detail below, include at least any two out of: in-network (IN) coverage, out-of-network (OON) coverage and partial network (PN) coverage.

The disclosure includes embodiments which can be implemented in a network device and a network capable cellular wireless device. The network device herein can be the serving network node of the cellular wireless device or any network device with which the cellular wireless device can establish or maintain a communication link and/or receive information (e.g. via broadcast channel).

The embodiments described herein use a generic term "cellular wireless device." However, cellular wireless device 14 may be any device which is capable of at least communication through wireless communication. For example, cellular wireless device 14 may be a radio communication device, sensor device, target device, device-to-device cellular wireless device, user equipment (UE), machine type cellular wireless device or cellular wireless device capable of machine to machine communication, a sensor equipped with cellular wireless device, tablet, mobile terminal, mobile telephone, laptop, computer, appliance, automobile, smart phone, laptop embedded equipped (LEE), laptop mounted equipment (LME), USB dongle and customer premises equipment (CPE), among other devices that can communicate radio or wireless signals as are known in the art.

The embodiments described herein use a generic term "D2D pair." However, a D2D transmitter and receiver can be any type of cellular wireless device, which is capable of at least communication through wireless communication. Examples of such UEs are sensor, modem, smart phone, machine type (MTC) device aka machine to machine (M2M) device, PDA, iPad, Tablet, laptop embedded equipped (LEE), laptop mounted equipment (LME), USB dongles etc.

Although terminology from 3GPP LTE (or E-UTRAN) has been used in this disclosure to describe the embodiments herein, this should not be seen as limiting the scope of the invention to only the aforementioned system. Other wireless systems, including Wideband Code Division Multiple Access (WCDMA), Universal Mobile Telecommunications System (UMTS) Terrestrial Radio Access-Frequency Division Duplexing (UTRA FDD), Universal Terrestrial Radio Access Time Division Duplexing (UTRA TDD, and Global System for Mobile Communications (GSM)/GSM Edge Radio Access Network (GERAN)/Enhanced Data rates for GSM Evolution (EDGE), may also benefit from exploiting the ideas covered within this disclosure.

The embodiments are described when D2D and cellular wireless devices are configured to be served by or operate with a single carrier (also referred to as single carrier operation of the cellular wireless device) for communication or configured to use or operate a single carrier in a network node. However, the embodiments are also applicable for multi-carrier or carrier aggregation based communication.

The computation complexity of the sum rate maximization algorithm described herein is low. The powers and beam weight are obtained essentially in closed-form. A fourth-order equation with closed-form solution is given. Then, one pair of powers out of a few candidates is selected in order to improve the sum rate. The algorithm can be advantageously implemented in an eNB scheduler due to its simplicity.

Furthermore, the sum rate maximization algorithm leads to a unique solution, i.e., powers and beam vectors optimized to help improve the sum rate. Hence, from an observability perspective, if a competitor uses the same algorithm with the same constraints and objective, the same powers are obtained for similar channel information. This can be observed by measuring transmitter powers of the cellular wireless device and D2D, SINR at the receivers, and ICI in the neighboring cell.

FIG. 1 is a block diagram of a wireless communication system 10 that includes a first network device 12a and a second network device 12b. Network devices 12a and 12b may be, for example, a base station or a long term evolution (LTE) enhanced Node B ("eNB") and may be referred to as "base station" or "eNB" interchangeably throughout this disclosure. Thus, a base station or an eNB is but one example of a network device 12 but the methods and arrangements disclosed herein may be applied to network devices other than only base stations or eNBs. Network devices 12a and 12b may be referred to collectively in this disclosure as "12." Although only two network devices 12 are shown in FIG. 1, it is noted that more than two network devices 12 may be included in communication system 10. One or both network devices may include power allocator 28 that is configured to perform the functions described in this disclosure. Network devices 12 serve cellular wireless devices in a region of coverage of the network devices 12. The cellular wireless devices may include two D2D cellular wireless devices 14a and 14b, referred to herein collectively as D2D cellular wireless devices 14. FIG. 1 also shows a cellular wireless device 16 in communication with the network devices 12 and possibly also in communication with a D2D cellular wireless device 14b.

Figure 2:
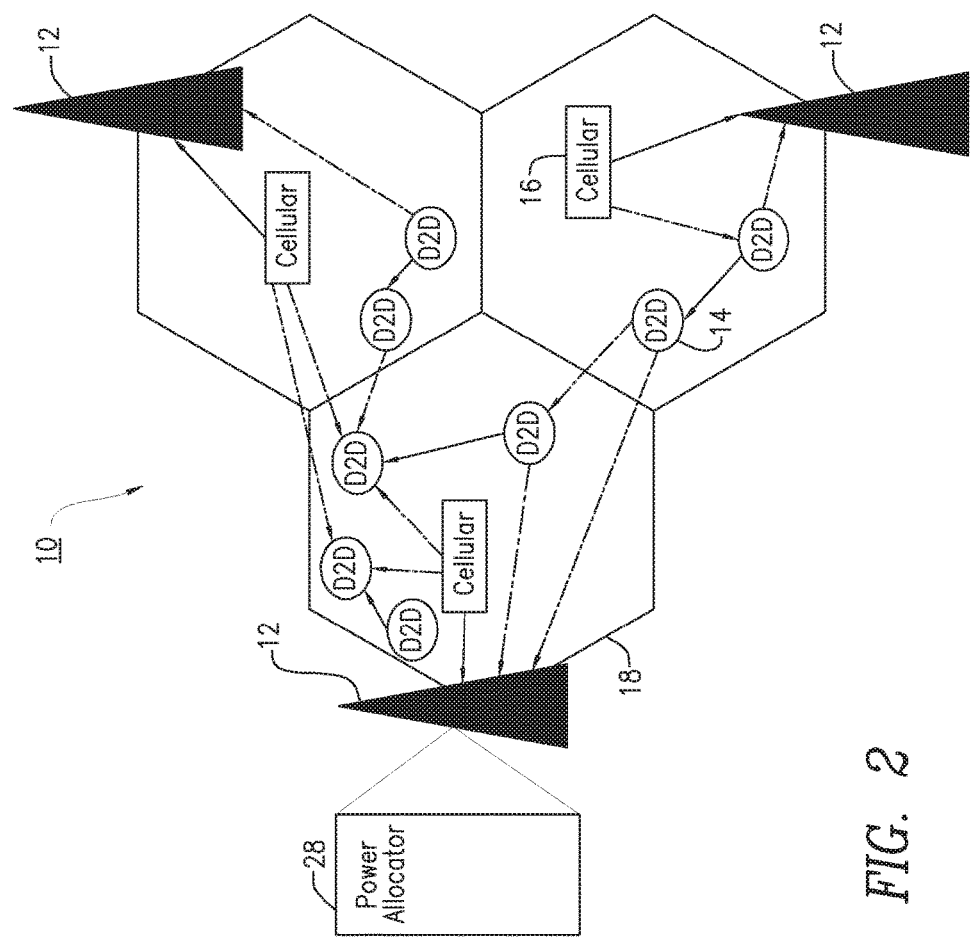
FIG. 2 is a block diagram of a wireless network supporting D2D communications over a plurality of cells and incorporating the power allocator of the present disclosure.

FIG. 2 is a block diagram of the wireless communication system 10 showing multiple network devices 12 each having a separate coverage area or cell 18. As in FIG. 1, one or more of the network devices 12 include power allocator 28, which are configured to perform the functions described in this disclosure. In FIGS. 1 and 2, the solid connecting lines depict desired cellular or D2D transmissions, and the dotted connecting lines depict examples of interference from other cellular and D2D cellular wireless devices. FIGS. 1 and 2 show two network devices or network devices 12, two D2D devices 14 and one cellular wireless device 16. However, the present disclosure is not limited to the number of network devices 12, D2D cellular wireless devices 14 and cellular wireless devices 16 shown in FIG. 1 and in FIG. 2 and the methods and arrangements described herein may be utilized with any number of network devices 12, D2D devices 14 and cellular wireless devices 16. A number of different embodiments are described below.

Device-to-Device Communication with Single Input, Multiple Output (SIMO) Beamforming The disclosure consists of the following example embodiment which is described in the subsequent sections. More specifically, this embodiment of the disclosure includes the following steps:

Step 1: Obtain CSI data of the transmit channels for the candidate D2D pair, the candidate cellular wireless device and at least one other cell eNB interference level;

Step 2: Determine feasibility conditions for pairing the D2D pair and the cellular wireless device transmissions; and Step 3: Solve the power allocation for the D2D/cellular wireless device pairing by determining a power allocation for the pairing of the D2D pair and cellular wireless device transmissions, the power allocation being based on a sum rate of the D2D pair and cellular wireless device transmissions.

The system parameter definitions and configuration under which the network and mobile user nodes operate are summarized below.

Communicating Nodes and Beamforming

In one embodiment, it is assumed that one cellular user and one D2D pair are served by the same network device 12 in the same physical cell as illustrated in FIG. 1. FIG. 1 illustrates an embodiment where D2D and cellular wireless devices are served by network device 12a, and are sharing Physical Resource Blocks (PRBs). In subsequent embodiments, this can be generalized to multiple D2D pairs. Furthermore, the following mobile and network devices are assumed to be configured as follows:

The cellular wireless device and D2D pair is equipped with a single antenna;

The network device has N antennas;

Receive beamforming is supported at the network device; and w: is defined as the unit-norm receive beamforming vector associated with a cellular wireless device.

Radio Resource Management (RRM) Parameters and Constraints

The following configuration is assumed to be supported with regard to RRM parameters:

Uplink resource sharing is supported;

Partial or full channel loading can be supported. For a fully loaded cell, all orthogonal channels are occupied;

Per-node power constraints are defined as $P_{max}^C$ being the maximum power for the cellular wireless device and $P_{max}^D$ being the maximum power for the D2D cellular wireless device;

$\sigma^2$ and $\sigma_D^2$ are the noise power levels measured in the network device and D2D cellular wireless device receivers respectively;

Both the cellular wireless device and D2D cellular wireless device pair have their minimum QoS requirements defined in terms of the received SINR;

$\tilde{\gamma}_C$ and $\tilde{\gamma}_D$ are the minimum SINRs guaranteed for the cellular and D2D cellular wireless devices respectively; and The constraint on the maximum inter-cell interference (ICI) to the neighboring cell network device is defined as $\tilde{I}$.

Step 1: Measured CSI Parameters

The channel state information (CSI) parameters are measured at the serving cell network node (i.e. eNB), the D2D pair, the cellular mobile cellular wireless device (i.e. cellular UE), or the neighboring cell network node as indicated: CSI is measured for the following channels $h_D$, $h_C$, $g_D$, $g_C$, $f_D$, and $f_C$ as defined below. The relevant duration and periodicity of the measurements can be defined by the network as a parameter or determined by the network device (i.e. eNB) scheduler as part of the measurement step of the disclosure. Where, $h_D \in \mathbb{C}$: is the channel response between the pair of D2D devices. This response can be communicated to the serving network device scheduler as part of a grant request message from the candidate transmitting D2D device;

$h_C \in \mathbb{C}^{N \times 1}$: is the channel response between cellular wireless device and the network device. This response can be measured on the downlink (DL) by the cellular wireless device and communicated to the serving network device scheduler as part of a grant request message from the cellular wireless device, or the channel response can be measured on the uplink (UL) by the serving network device;

$g_D \in \mathbb{C}^{N \times 1}$: is the interference channel between D2D transmitter and the serving network device, as measured by the serving base station;

$g_C \in \mathbb{C}$: is the interference channel between cellular wireless device and receiving mobile device of the D2D pair. This measured response can be communicated to the serving network device by either the cellular wireless device as part of its grant request, directly by the receiving mobile device of the D2D pair, or by the transmitting device of the D2D pair as part of its grant request;

$f_D \in \mathbb{C}^{N \times 1}$: is the ICI channel between D2D transmitting cellular wireless device and the neighboring network device. This channel can be measured at the neighboring base station and communicated back to the serving network device through an X2 link, for example;

$f_C \in \mathbb{C}^{N \times 1}$: is the ICI channel between cellular wireless device and the neighboring network device. This channel can be measured at the neighboring network device and communicated back to the serving network device through an X2 link, for example.

In this disclosure it may be assumed that the PRBs of cellular wireless devices are shared with the D2D pair. The D2D pair shares at most the resource assignment of one cellular wireless device, i.e., each D2D interferes with at most one cellular wireless device. The SINR of the D2D receiver node is given by $$\gamma_D = \frac{P_D |h_D^2|}{\sigma_D^2 + P_C |g_C|^2}. \tag{1}$$

The SINR of the cellular wireless device signal is given by $$\gamma_C = \frac{P_C |w^H h_C|^2}{\sigma^2 + P_D |w^H g_D|^2} \tag{2}$$

If w represents the beamforming weights, it is assumed that unit norm beam weights, i.e., $\|w\|^2 = 1$. Consider the neighboring cell. The maximum inter-cell interference (ICI) received in the neighboring network device after beamforming is expressed as $$P_I = P_C \|f_C\|^2 + P_D \|f_D\|^2 \tag{3}$$

Note that the actual ICI is upper-bounded by (Equation 3) since $|w_I^H f| \leq \|f\|$, where $w_I$ denotes the neighboring cell beamforming vector.

This disclosure maximizes the sum rate by optimizing the set of powers $\{P_C, P_D\}$ and beamforming vector w, under the power and interference constraints, and QoS requirements. The sum rate maximization problem is given by $$\max_{P_D, P_C, w} \left( \frac{\log(1+\gamma_C)}{2} + \frac{\log(1+\gamma_D)}{2} \right) \quad (4)$$

subject to $\gamma_C \geq \tilde{\gamma}_C$ (5)

$\gamma_D \geq \tilde{\gamma}_D$ (6)

$P_C \leq P_C^{max}, P_D \leq P_C^{max}$ (7)

$P_C \|f_C\|^2 + P_D \|f_D\|^2 \leq \tilde{I}$ (8)

Example Algorithm for Solving (Equation 4)

The sum-rate maximization problem (Equation 4) is non-convex. An approach to solve the problem (Equation 4) is summarized in Algorithm 1, described below. The following parameters are employed in the method to maximize the sum rate: For notation simplicity in the proofs, $x = P_D$ and $y = P_C$: denotes the D2D and cellular wireless device transmit power respectively $P_D^0 = x^0$ and $P_C^0 = y^0$: denote the D2D and cellular wireless device power respectively

- $\rho = \frac{|h_C^H g_D|}{\|h_C\| \|g_D\|}$ the correlation coefficient

-continued

- $c_1 = \|f_C\|^2 / \tilde{I}$ and $c_2 = \|f_D\|^2 / \tilde{I}$

- $\alpha = \frac{\tilde{\gamma}_C \sigma^2}{\|h_C\|^2}, \beta = \frac{\tilde{\gamma}_D}{|h_D|^2}, a = |h_D|^2, b = \|h_C\|^2/\sigma^2,$

- $K_1 = \rho^2$, and $K_2 = \frac{\sigma^2}{\|g_D\|^2}$, and $K_3 = |g_C|^2$

- $a_1 = \sigma_D^2 + K_3/c_1, K_4 \stackrel{\Delta}{=} K_3 \, c_2/c_1, b_1 = b/c_1$, and $b_2 = b \, c_2/c_1$

- $\psi_1 = \frac{1 - K_1 - c_2 K_2 - \alpha c_1 + \sqrt{(K_1 + c_2 K_2 + \alpha c_1 - 1)^2 - 4c_2(1-K_1)K_2(\alpha c_1 - 1)}}{2c_2(1-K_1)}$ and $\psi_2 = \frac{\sigma_D^2 \beta K_3/c_1}{1 + \beta K_3 c_2/c_1}$ Algorithm 1—approach to solve the sum-rate maximization problem (Equation 4)

Input: $\alpha, \beta, a, b, a_1, b_1, b_2, K_1, K_2, K_3, K_4, \psi_1, \psi_2, c_1, c_2, \tilde{\gamma}_C, \tilde{\gamma}_D, \sigma^2, \gamma^2, P_C^{max}, P_D^{max}$ Output: The cellular wireless device power $P_C^0$, the D2D power $P_D^0$, and the beam vector w.

| Algorithm 1 |
|---|
| 1: Check the feasibility condition (Equation 22)-(Equation 24) |
| 2: if (Equation 40) and (Equation 41) hold then |
| 3:    if (Equation 42) holds then (Scenario 1) |
| 4:       Compute candidate solution set $P^o = P^{(A.1)}$ in Scenario 1 (FIG. 3) |
| 5:    else if (Equation 44) and (Equation 45) hold then (Scenario 2) |
| 6:       Solve (Equation 36) and compute candidate solution set $P^o = P^{(A.2)}$ in Scenario 2 (FIG. 4) |
| 7:    else if (Equation 44) and (Equation 47) hold then (Scenario 3) |
| 8:       Solve (Equation 36) and compute candidate solution set $P^o = P^{(A.3)}$ in Scenario 3 (FIG. 5) |
| 9:    else if (Equation 49) holds then (Scenario 4) |
| 10:       Solve (Equation 36) and compute candidate solution set $P^o = P^{(A.4)}$ in Scenario 4 (FIG. 6) |
| 11:    else if (Equation 47) and (Equation 51) hold then (Scenario 5) |
| 12:       Solve (Equation 36) and compute candidate solution set $P^o = P^{(A.5)}$ in Scenario 5 (FIG. 7) |
| 13:    else if (Equation 53) holds then (Scenario 6) |
| 14:       Compute candidate solution set $P^o = P^{(A.6)}$ in Scenario 6 (FIG. 8) |
| 15:    end if |
| 16: else if (Equation 41) and (Equation 55) hold then |
| 17:    if (Equation 56) holds then (Scenario 7) |
| 18:       Solve (Equation 36) and compute candidate solution set $P^o = P^{(B.1)}$ in Scenario 7 (FIG. 9) |
| 19:    else if (Equation 47) and (Equation 57) hold then (Scenario 8) |
| 20:       Solve (Equation 36) and compute candidate solution set $P^o = P^{(B.2)}$ in Scenario 8 (FIG. 10) |
| 21:    else if (Equation 53) holds then (Scenario 9) |
| 22:       Compute candidate solution set $P^o = P^{(B.3)}$ in Scenario 9 (FIG. 11) |
| 23:    end if |
| 24: else if (Equation 40) and (Equation 58) hold then |
| 25:    if (Equation 42) holds then (Scenario 10) |
| 26:       Compute candidate solution set $P^o = P^{(C.1)}$ in Scenario 10 (FIG. 12) |
| 27:    else if (Equation 44) and (Equation 59) hold then (Scenario 11) |

Algorithm 1

```
      28:            Solve (Equation 36) and compute candidate solution set
P° = P^(C.2) in Scenario 11 (FIG. 13)
      29:            else if (Equation 60) holds then (Scenario 12)
      30:                Solve (Equation 36) and compute candidate solution set
P° = P^(C.3) in Scenario 12 (FIG. 14)
      31:            end if
      32:       else if (Equation 55) and (Equation 58) hold then (Scenario 13)
      33:            Solve (Equation 36) and compute candidate solution set P°
= P^(D.1) in Scenario 13 (FIG. 15)
      34:       else if either (Equation 62) or (Equation 63) does not hold then
      35:            if (Equation 64) holds then (Scenario 14)
      36:                Compute candidate solution set P° = P^(E.1) in Scenario
14 (FIG. 16)
      37:            else if (Equation 65) and (Equation 66) hold then (Scenario
15)
      38:                Compute candidate solution set P° = P^(E.2) in Scenario
15 (FIG. 17)
      39:            else if (Equation 68) holds then (Scenario 16)
      40:                Compute candidate solution set P° = P^(E.3) in Scenario
16 (FIG. 18):          end if
          42: end if
          43: Enumerate among candidate solution set P° to find the optimum
    solution
          44: Obtain the beamforming vector (11)
Approach to solve the sum-rate maximization problem (Equation 4)
```

The non-convex optimization problem (Equation 4) is solved by formulating and solving two sub-problems; namely, determine whether the D2D pair can share the same PRBs as being employed by the cellular wireless device. A feasibility test is used to determine this; and determine power $P_D^0$ and $P_C^0$ through the sum-rate maximization.

Below, the feasibility sub-problem is addressed in detail. The optimum power allocation problem is solved in Step 3—Determining the Power Allocation.

Step 2: Determine the Feasibility Conditions of Pairing the D2D Cellular Wireless Device with the Cellular Wireless Device In Step 2, the aim is to find the necessary and sufficient condition to determine whether the D2D pair can be admitted. In order to allow the D2D pair to share the cellular wireless device resource, the constraints (Equation 5)-(Equation 8) should be satisfied, i.e., $$\text{find } \{P_C, P_D, w\}(5), (6), (7), (8) \tag{9}$$

$H_C = h_C h_C^H$ and $\Lambda_D = \sigma^2 I + P_D g_D g_D^H$. Then the beamforming problem at the BS for a fixed set of powers $\{P_C, P_D\}$ can be written as $$\max_w \frac{P_C w^H H_C w}{w^H \Lambda_D w} \tag{10}$$

Since (Equation 10) has the generalized eigenvalue problem structure, the beamforming vector is given by $$w^0 = \Lambda_D^\dagger h_C \tag{11}$$

If $\Lambda_D > 0$ is shown, the pseudo inverse $\Lambda_D^\dagger$ becomes the matrix inversion, leading to $w^0 = \Lambda_D^{-1} h_C$. Using the matrix inversion lemma, it can be shown that $$\Lambda_D^{-1} = \frac{1}{\sigma^2}\left(I - \frac{P_D g_D g_D^H}{\sigma^2 + P_D \|g_D\|^2}\right) \tag{12}$$

Substituting (Equation 11) into (Equation 2), the maximum SINR associated with the cellular wireless device is given by $$\max_w \gamma_C = P_C h_C^H \Lambda_D^{-1} h_C \tag{13}$$

The correlation coefficient of the desired cellular wireless device channel and the interference channel from D2D transmitter to BS is denoted as $$\rho = \frac{|h_C^H g_D|}{\|h_C\|\|g_D\|}.$$

After some algebraic manipulation, (Equation 13) becomes $$\max_w \gamma_C = \frac{P_C \|h_C\|^2}{\sigma^2}\left(1 - \frac{\rho^2}{1 + \frac{\sigma^2}{P_D \|g_D\|^2}}\right) \tag{14}$$

After beamforming and substituting the beam weights, the feasibility test problem is finding $\{P_C, P_D\}$ such that (Equation 6)-(Equation 8)

$$\frac{P_C \|h_C\|^2}{\sigma^2}\left(1 - \frac{\rho^2}{1 + \frac{\sigma^2}{P_D \|g_D\|^2}}\right) \geq \tilde{\gamma}_C, \tag{15}$$

The constraint (Equation 6) is characterized by a line on the $P_C$-$P_D$ plane. Constraint (Equation 15) may be used to obtain the necessary and sufficient conditions for the problem (Equation 4) to be feasible.

Proposition 1. Suppose that the constraints (15) and (6) are met with equality. Then there exists a set of powers $\{P_C, P_D\}$ satisfying these two equality constraints.

Proof For notation simplicity, D2D and cellular wireless device powers are denoted by x and y in the following. For D2D and cellular wireless device power, the notations $P_D^0 = x^0$ and $P_C^0 = y^0$ are used. If (Equation 15) is met with equality, it may be rewritten as $$y = \alpha\left(1 - \frac{K_1}{1 + K_2/x}\right)^{-1}, \text{where} \qquad (16)$$

$$\alpha = \frac{\tilde{\gamma}_C \sigma^2}{\|h_C\|^2}, K_1 = \rho^2 < 1, \text{ and } K_2 = \frac{\sigma^2}{\|g_D\|^2}.$$

It can be shown that $$\frac{dy}{dx} = \alpha K_1 K_2 \left(1 - \frac{K_1}{1 + K_2/x}\right)^{-2} (x + K_2)^{-2} > 0, \qquad (17)$$

$$\frac{d^2y}{dx^2} = 2\alpha K_1 K_2 (K_1 - 1)\left(1 - \frac{K_1}{1 + K_2/x}\right)^{-3} (x + K_2)^{-3} < 0 \qquad (18)$$

Hence, y is a concave strictly increasing function of x. The SINR constraint (Equation 6) is expressed as $$\frac{x}{\sigma_D^2 + K_3 y} = \beta, \text{ where} \qquad (19)$$

$$\beta = \frac{\tilde{\gamma}_D}{|h_D|^2} \text{ and } K_3 = |g_C|^2.$$

D2D and cellular wireless device power satisfying both (Equation 16) and (Equation 19) are denoted by $x_l$ and $y_l$, respectively. Solving the intersection of the line (Equation 19) and the curve (Equation 16), leads to $$x_l = \frac{\xi}{2(1 - K_1)} \qquad (20)$$

$$y_l = \frac{\xi}{2(1 - K_1)\beta K_3} - \frac{\sigma_D^2}{K_3}, \text{ where} \qquad (21)$$

$$\xi = \beta(\alpha K_3 + \sigma_D^2(1 - K_1)) - K_2 +$$
$$\sqrt{(\beta(\alpha K_3 + \sigma_D^2(1 - K_1)) - K_2)^2 + 4(1 - K_1)\beta K_2(\alpha K_3 + \sigma_D^2)}$$

There is a necessary and sufficient condition for feasibility of D2D communication that is given by $$0 < x_l \leq P_D^{max}, \qquad (22)$$

$$0 < y_l \leq P_C^{max}, \qquad (23)$$

$$c_1 y_l + c_2 x_l \leq 1, \qquad (24)$$

where $c_1 = \|f_C\|^2/\tilde{I}$ and $c_2 = \|f_D\|^2/\tilde{I}$. Note that if either (Equation 22) or (Equation 23) do not hold, the maximum D2D or cellular wireless device power is not enough to meet both SINR targets. If (Equation 24) does not hold, the ICI constraint cannot be satisfied.

Below, the optimum power allocation problem is solved in order to determine an improved sum rate (Equation 4).

Step 3: Determine the Power Allocation

After substituting (Equation 11) into (Equation 2), the problem of maximizing the sum rate for a D2D pair and a cellular wireless device becomes:

$$(P_D^o, P_C^o) = \arg\max_{(P_D, P_C)} (\log(1 + \gamma_C) + \log(1 + \gamma_D)), \qquad (25)$$

subject to (Equation 5)-(Equation 8).

The objective function (Equation 25) can be expressed as $$R(x, y) = \log\left(\left(1 + \frac{ax}{\sigma_D^2 + K_3 y}\right)\left(1 + by\left(1 - \frac{K_1 x}{K_2 + x}\right)\right)\right), \qquad (26)$$

where $= |h_D|^2$ and $b = \|h_C\|^2/\sigma^2$.

Lemma 1. For any given power pair (x, y) in the interior of the admissible area and any $\zeta > 1$, there exists another power pair $(\zeta x, \zeta y)$ such that $$R(\zeta x, \zeta y) > R(x, y). \qquad (27)$$

Proof. Since log is a strictly increasing function, we consider $$\hat{R}(\zeta x, \zeta y) = \left(1 + \frac{ax}{\sigma_D^2/\zeta + K_3 y}\right)\left(1 + \zeta by\left(1 - \frac{K_1 x}{K_2/\zeta + x}\right)\right) \qquad (28)$$

Therefore, $$1 + \frac{ax}{\sigma_D^2/\zeta + K_3 y} > 1 + \frac{ax}{\sigma_D^2 + K_3 y}.$$

Now, $\Phi(\zeta) = \zeta$ by $(1 - K_1 x(x + K_2/\zeta)^{-1})$ is defined. This leads to $$\frac{d\Phi(\zeta)}{d\zeta} = by \frac{xK_2(1 - K_1) + \zeta x^2(1 - K_1) + K_2/\zeta(K_2/\zeta + x(1 - K_1))}{\zeta(x + K_2/\zeta)^2} > 0, \qquad (29)$$

In the following, the objective (Equation 25) is first described assuming the constraint (Equation 8) is not active at optimality. Then the scenario, when (Equation 8) is active at optimality in Lemma 2 is considered. If the power pair is on the boundary line segment, where at least one of the powers is the maximum $\{P_C^{max}, P_D^{max}\}$, i.e., (Equation 8) is not active, Lemma 1 shows that at least one power in the pair $(P_C^0, P_D^0)$ will be the maximum allowable power at optimality. In the following, the behavior of $h(x) = \hat{R}(x, P_C^{max})$ and $g(y) = \hat{R}(P_D^{max}, y)$ is considered in order to find the power allocation.

Proposition 2. If the power pair is on the boundary line segment, where at least one of the powers is the maximum $\{P_C^{max}, P_D^{max}\}$, the power pair is an end point of the line segment.

Proof. The function g(y) can be written as $$g(y) = \left(1 + \frac{\alpha_1}{\alpha_2 + y}\right)(1 + \alpha_3 y). \qquad (30)$$

Taking the derivative of (Equation 30), leads to $$\frac{dg}{dy} = \frac{\alpha_3 y^2 + 2\alpha_2\alpha_3 y + \mu}{(\alpha_2 + y)^2}, \quad (31)$$

where $\mu=\alpha_3\alpha_2^2+\alpha_1(\alpha_2\alpha_3-1)$. Then either $$\frac{dg}{dy} > 0$$

(i.e., g(y) is strictly increasing), of $$\frac{dg}{dy} = 0$$

has a valid solution which occurs only if $\mu<0$. Supposing $\mu<0$ and taking the second derivative, leads to $$\frac{d^2 g}{dy^2} = \frac{2\alpha_1(1-\alpha_2\alpha_3)}{(\alpha_2+y)^3} > 0, \quad (32)$$

since $\mu<0$ implies $\alpha_1(1-\alpha_2\alpha_3)>0$. In other words, $\hat{R}(P_D^{max},P_C)$ is a convex function of $P_C$. Now suppose that $P_C^0=P_c^{max}$. Then $h(_x)$ can be written as $$h(x) = (1+\beta_1 x)\left(1+\beta_2\left(1-\frac{K_1}{K_2/x+1}\right)\right). \quad (33)$$

Taking the derivative of (Equation 25), leads to $$\frac{dh}{dx} = \frac{\beta_1(1+\beta_2(1-K_1))x^2 + 2\beta_1 K_2(1+\beta_2(1-K_1))x + \omega}{(x+K_2)^2}, \quad (34)$$

where $\omega=\beta_1 K_2^2+\beta_1\beta_2 K_2^2-\beta_2 K_1 K_2$. Note that $$\frac{dh}{dx} = 0$$

has a valid solution only if $\omega<0$. If $\omega<0$, then the second derivative of (Equation 25) becomes $$\frac{d^2 h}{dx^2} = \quad (35)$$
$$\frac{2\beta_1 K_2(1+\beta_2(1-K_1))K_2 + 2(\beta_2 K_1 K_2 - \beta_1 K_2^2 - \beta_1\beta_2 K_2^2)}{(x+K_2)^3} > 0.$$

Hence $\hat{R}(P_D, P_C^{max})$ is a convex function of $P_D$. Therefore, from Lemma 1, the power, if it exists, is not in the interior of the feasible region. The power can be determined if it is one of the corners of the rectangle on the power plane due to maximum power constraints. In the following, the scenario where the power pair is on the titled line due to ICI constraint, i.e., $c_1 y+c_2 x=1$ is considered.

Lemma 2. If the power is on the tilted line due to ICI, the D2D TX power is one of the roots of the following fourth-order equation, which has a closed-from solution $$e_4 x^4 + e_3 x^3 + e_2 x^2 + e_1 x + e_0 = 0, \quad (36)$$

where $e_0 = aa_1 K_2^2(b_1+1) - a_1^2 b_1 K_1 K_2 - a_1^2 b_2 K_2^2$ $e_1 = -2aa_1 b_2 K_2^2 + aa_1 K_2(b_1+1) + aa_1 K_2 - 2aa_1 K_1 K_2 b_1 + aa_1 b_1 K_2 + 2a_1^2 b_2 K_2(K_1-1) + 2a_1 b_1 K_1 K_2 K_4 + 2a_1 b_2 K_2^2 K_4$ $e_2 = aa_1 b_2 K_2(3K_1-4) + aa_1(1+b_1(1-K_1)) - a_1^2 b_2(1-K_1) + b_2 K_2^2 K_4(a-K_4) + b_1 K_1 K_2 K_4(a-K_4) - 4a_1 b_2 K_2 K_4(K_1-1)$ $e_3 = 2aa_1 b_2(1-K_1) + 2a_1 K_4 b_2(1-K_1) - 2b_2 K_2 K_4(K_1-1)(a-K_4)$ $e_4 = K_4(a-K_4)b_2(1-K_1)$, and $a_1=\sigma_D^2+K_3/c_1$, $K_4=K_3 c_2/c_1$, $b_1=b/c_1$, and $b_2=b\, c_2/c_1$. The cellular wireless device power associated with the root $x^o$ is given by $$y^o = \frac{1-c_2 x^o}{c_1}.$$

Proof. The power on the line due to ICI is the solution of the following optimization problem $$\max_{(x,y)}\left(1+\frac{ax}{\sigma_D^2+K_3 y}\right)\left(1+by\left(1-\frac{K_1 x}{K_2+x}\right)\right) \quad (37)$$

subject to $c_1 y + c_2 x = 1$. $\quad (38)$

Substituting $$y = \frac{1-c_2 x}{c_1}$$

into (Equation 37), the optimization problem becomes $$\max_x \tilde{R}(x), \text{ where } \tilde{R}(x) \stackrel{\Delta}{=} \left(1+\frac{ax}{a_1-K_4 x}\right)\left(1+(b_1-b_2 x)\left(1-\frac{K_1 x}{K_2+x}\right)\right). \quad (39)$$

Since $\tilde{R}(x)$ is continuous and has the first order derivative, the optimum x is obtained by solving $$\frac{d\tilde{R}(x)}{dx} = 0.$$

Computing the derivative and after some algebraic manipulations, $$\frac{d\tilde{R}(x)}{dx} = 0$$

can be recast as (Equation 28), which completes the proof.

Note that there is no need to compute all the roots of (Equation 36). Only the root $x_i$ satisfying $$\frac{1-c_1 P_C^{max}}{c_2} \le x_i \le P_D^{max}$$

is considered, assuming $$\frac{1-c_1 P_C^{max}}{c_2} \ge 0.$$

Then the power pair $$\left(x_i, \frac{1-c_2 x_i}{c_1}\right)$$

could be the power allocation, e.g., optimum power allocation for helping improve the data rate while considering ICI.

In the following sections, all different scenarios are classified with the conditions and corresponding power allocation for each case.

Weak Cellular Wireless Device and D2D ICI

In one embodiment, the ICI channel for both the cellular wireless device and D2D transmitter is considered to be weak. This case happens if the tilted line intersects the top right corner of the rectangle on the power plane. In this scenario, there is $$\frac{1-c_2 P_D^{max}}{c_1} \le P_C^{max} \le \frac{1}{c_1} \quad (40)$$

$$\frac{1-c_1 P_C^{max}}{c_2} \le P_D^{max} \le \frac{1}{c_2}. \quad (41)$$

The power allocation such as an optimum power allocation is given by one of the following scenarios.

Figure 3:
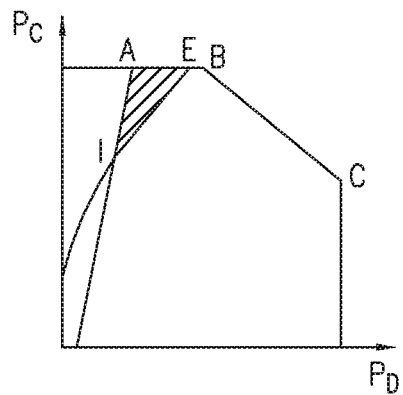
FIG. 3 is a diagram of power constraint conditions for scenario #1 in accordance with the principles of the disclosure.

Scenario 1: The graph of scenario 1 is depicted in FIG. 3 that illustrates the power constraint conditions for scenario #1. This scenario occurs when there is no intersection between the tilted line B-C and the curves I-E and I-A due to SINR constraints (Equation 5) and (Equation 6), respectively. The condition for this scenario is as follows $$K_2\left(\frac{K_1}{1-\frac{\tilde{\gamma}_C}{b P_C^{max}}} - 1\right)^{-1} \le \frac{1-c_1 P_C^{max}}{c_2}. \quad (42)$$

According to Lemma 1, it is sufficient to consider only the points A and E to find the power allocation. The set of candidates to be power is given by $$P^{(A.1)} = \left\{(\beta(\sigma_D^2 + K_3 P_C^{max}), P_C^{max}), \left(K_2\left(\frac{K_1}{1-\frac{\tilde{\gamma}_C}{b P_C^{max}}} - 1\right)^{-1}, P_C^{max}\right)\right\}. \quad (43)$$

Figure 4:
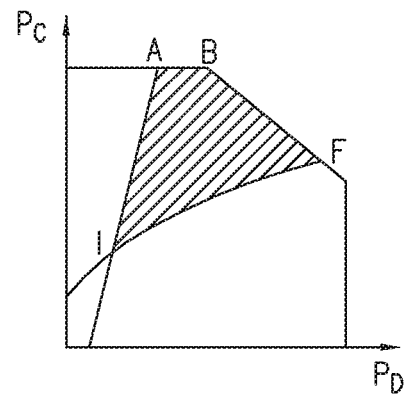
FIG. 4 is a diagram of power constraint conditions for scenario #2 in accordance with the principles of the disclosure.

Scenario 2: FIG. 4 shows the graph of scenario 2 in which FIG. 4 illustrates the power constraints conditions for scenario #2. In this scenario, the curve I-F intersects the tilted line, however, I-A has no intersection with the tilted line. The condition for this scenario is as follows $$\beta(\sigma_D^2 + K_3 P_C^{max}) \le \frac{1-c_1 P_C^{max}}{c_2} \quad (44)$$

$$\frac{1-c_1 P_C^{max}}{c_2} \le \psi_1 \le P_D^{max}, \text{ where} \quad (45)$$

$$\psi_1 = \Delta \frac{1 - K_1 - c_2 K_2 - \alpha c_1 + \sqrt{(K_1 + c_2 K_2 + \alpha c_1 - 1)^2 - 4c_2(1 - K_1)K_2(\alpha c_1 - 1)}}{2c_2(1 - K_1)}, \text{ i.e.,}$$

the x-coordinate of point F. There are three cases for the pair of power, i.e., optimum pair of power. If the cellular wireless device power is its maximum $P_{C,0}$, the point is either point A or B based on Lemma 1. Using Lemma 2, the roots of (Equation 36) that are between the x-coordinates of B and F or the corner points need to be found. The set of candidates to be power is given by $$P^{(A.2)} = \{(\beta(\sigma_D^2 + K_3 P_C^{max}), P_C^{max}), ((1-c_1 P_C^{max})/c_2, P_C^{max}), (\psi_1, (1-c_2\psi_1)/c_1), A_2\}, \quad (46)$$

where $A_2 \stackrel{\Delta}{=} \{(x_i^0, (1-c_2 x_i^0)/c_1)\}$ and $(1-c_1 P_c^{max})/c_2 < x_i^0 < \psi_1$ is the root of (Equation 36) in the specific interval.

Figure 5:
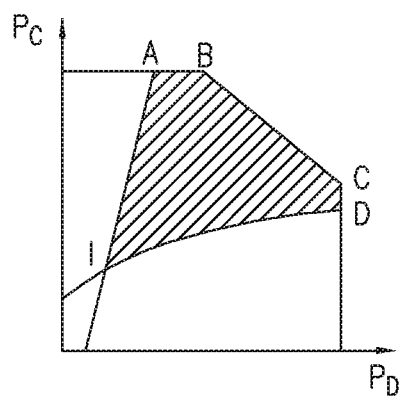
FIG. 5 is a diagram of power constraint conditions for scenario #3 in accordance with the principles of the disclosure.

Scenario 3: The graph of scenario 3 is illustrated in FIG. 5 in which FIG. 5 illustrates the power constraint conditions for scenario #3. In this scenario, the curves I-D and I-A have no intersection with B-C. The entire tilted line is in the feasible region. The condition for this scenario is given by $$\alpha\left(1 - \frac{K_1}{1 + K_2/P_D^{max}}\right)^{-1} \le \frac{1-c_2 P_D^{max}}{c_1}, \quad (47)$$

Based on Lemma 1 and Lemma 2, the power could be given by either of the end points A,B,C,D or any power given by the root of (Equation 36) limited to be in the interval defined by x-coordinates of B and C, i.e., the power is in the following set $$P^{(A.3)} = \left\{(\beta(\sigma_D^2 + K_3 P_C^{max}), P_C^{max}), ((1-c_1 P_C^{max})/c_2, P_C^{max}),\right. \quad (48)$$

$$\left.(P_D^{max}, (1-c_2 P_D^{max})/c_1), \left(P_D^{max}, \alpha\left(1 - \frac{K_1}{1 + K_2/P_D^{max}}\right)^{-1}\right), A_3\right\},$$

where $A_3 \stackrel{\Delta}{=} \{(x_i^0, (1-c_2 x_i^0)/c_1)\}$ and $(1-c_1 P_c^{max})/c_2 < x_i^0 < P_D^{max}$ is the root of (Equation 36) in the specific interval.

Figure 6:
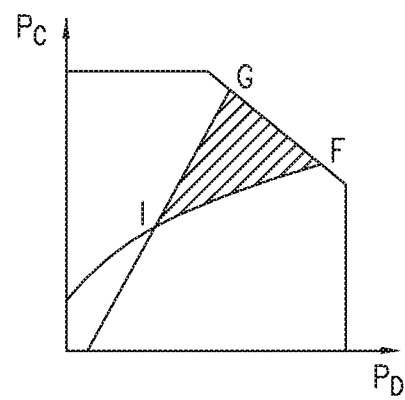
FIG. 6 is a diagram of power constraint conditions for scenario #4 in accordance with the principles of the disclosure.

Scenario 4: FIG. 6 depicts the graph of scenario 4 in which FIG. 6 illustrates power constraint conditions for scenario #4. In this scenario, both curves I-F and I-G intersect the tilted line. The condition for this scenario is as follows $$\frac{1-c_1 P_C^{max}}{c_2} \leq \psi_2 \leq \psi_1 \leq P_D^{max} \qquad (49)$$

where $$\psi_2 = \Delta \frac{\sigma_D^2 \beta + \beta K_3/c_1}{1 + \beta K_3 c_2/c_1}, \text{ i.e.,}$$

the x-coordinate of point G. In order to find the power, i.e., optimum power, end points G and F are considered. In addition, the roots of (Equation 36) that are between the x-coordinates of G and F are obtained. The set of candidates for the power is as follows $$P^{(A.4)} = \{(\psi_2, (1-c_2\psi_2)/c_1), (\psi_1, (1-c_2\psi_1)/c_1), A_4\}, \qquad (50)$$

where $A_4 = \Delta\{(x_i^0, (1-c_2 x_i^0)/c_1)\}$ and $\psi_2 < x_i^0 < \psi_1$ is the root of (36) in the specific interval.

Figure 7:
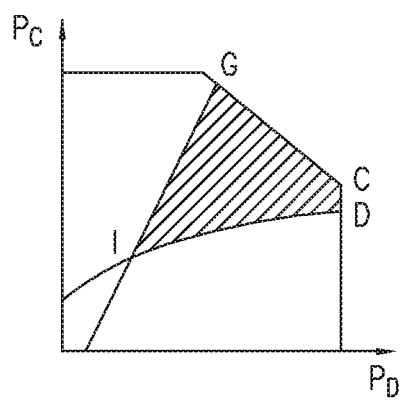
FIG. 7 is a diagram of power constraint conditions for scenario #5 in accordance with the principles of the disclosure.

Scenario 5: The graph of scenario 5 is shown in FIG. 7 in which FIG. 7 illustrates the power constraint conditions for scenario #5. In this scenario, the line I-G has an intersection with G-C. The curve I-D has no intersection with G-C. The condition for this scenario is given by $$\frac{1-c_1 P_C^{max}}{c_2} \leq \psi_2 \leq P_D^{max}, \qquad (51)$$

Based on Lemma 1 and Lemma 2, the power could be given by either of the end points G,C,D or any power given by the root of (Equation 36) limited to be in the interval defined by x-coordinates of G and C, i.e., the power is in the following set $$P^{(A.5)} = \left\{ \left(\psi_2, \frac{1-c_2\psi_2}{c_1}\right), (P_D^{max}, (1-c_2 P_D^{max})/c_1), \left(P_D^{max}, \alpha\left(1-\frac{K_1}{1+K_2/P_D^{max}}\right)^{-1}\right), A_5 \right\}, \qquad (52)$$

where $A_5 = \Delta\{(x_i^0, (1-c_2 x_i^0)/c_1)\}$ and $\psi_2 < x_i^0 < P_D^{max}$ is the root of (Equation 36) in the specific interval.

Figure 8:
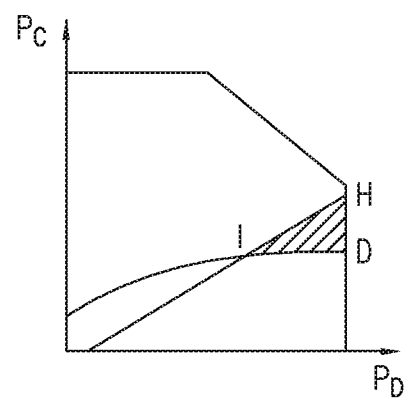
FIG. 8 is a diagram of power constraint conditions for scenario #6 in accordance with the principles of the disclosure.

Scenario 6: The graph of scenario 6 is depicted in FIG. 8 in which FIG. 8 illustrates the power constraint conditions for scenario #6. This scenario happens when there is no intersection between the tilted line and the curves I-H and I-D. The condition for this scenario is as follows $$\frac{P_D^{max} - \beta\sigma_D^2}{\beta K_3} \leq \frac{1-c_2 P_D^{max}}{c_1}. \qquad (53)$$

According to Lemma 1, it is sufficient to consider only the points H and D to find the power allocation, i.e., optimum power allocation. The set of candidates to be optimum power is given by $$P^{(A.6)} = \left\{ \left(P_D^{max}, \alpha\left(1-\frac{K_1}{1+K_2/P_D^{max}}\right)-1\right), \left(P_D^{max}, \frac{P_D^{max} - \beta\sigma_D^2}{\beta K_3}\right) \right\}, \qquad (54)$$

Strong Cellular Wireless Device ICI and Weak D2D ICI

In another embodiment, the scenario where the ICI channel for cellular wireless device is strong is considered. However, the ICI channel from D2D TX to the neighbouring cell is weak. This case happens if the tilted line forces the maximum cellular wireless device power to be less that $P_C^{max}$ and determined by the cellular wireless device ICI channel. In this scenario, $$\frac{1}{c_1} \leq P_C^{max} \qquad (55)$$

The necessary and sufficient conditions for feasibility of D2D communication are given by (Equation 22) and (Equation 24). The optimum power allocation is given by one of the following scenarios.

Figure 9:
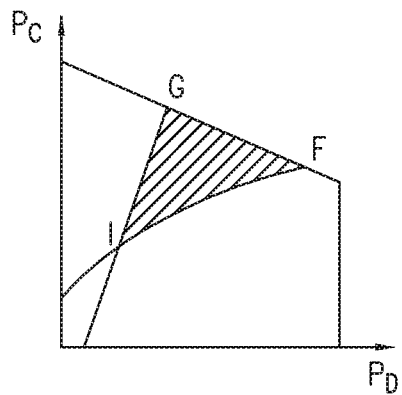
FIG. 9 is a diagram of power constraint conditions for scenario #7 in accordance with the principles of the disclosure.

Scenario 7: FIG. 9 depicts the graph of scenario 7 in which FIG. 9 illustrates the power constraint conditions for scenario #7. In this scenario, both curves I-F and I-G intersect the tilted line. The condition for this scenario is as follows $$0 \leq \psi_2 \leq \psi_1 \leq P_D^{max} \qquad (56)$$

In order to find the power such as the optimum power, the end points G and F are considered. In addition, the roots of (Equation 36) that are between the x-coordinates of G and F are obtained. The set of candidates for the power is given by $P^{(B.1)} = P^{(A.4)}$.

Figure 10:
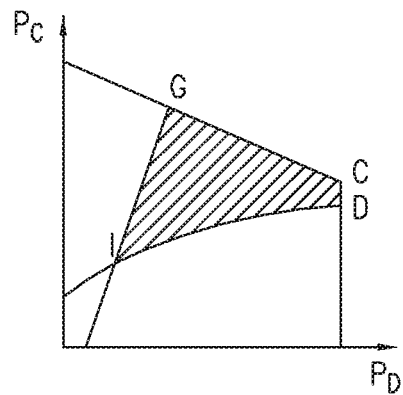
FIG. 10 is a diagram of power constraint conditions for scenario #8 in accordance with the principles of the disclosure.

Scenario 8: The graph of scenario 8 is shown in FIG. 10 in which FIG. 10 is the power constraint conditions for scenario #8. In this scenario, the line I-G has an intersection with G-C. The curve I-D has no intersection with G-C. The condition for this scenario is given by $$0 \leq \psi_2 \leq P_D^{max}, \qquad (57)$$

Based on Lemma 1 and Lemma 2, the power such as the optimum power could be given by either of the end points G,C,D or any power given by the root of (Equation 36) limited to be in the interval defined by x-coordinates of G and C, i.e., the optimum power is obtained by $P^{(B.2)} = P^{(A.5)}$.

Figure 11:
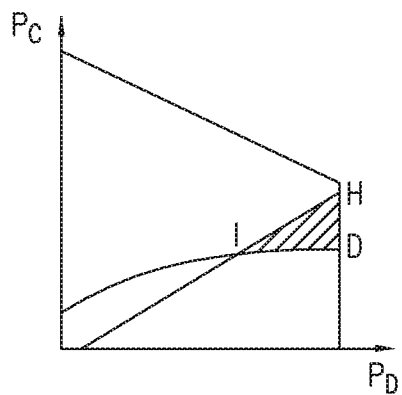
FIG. 11 is a diagram of power constraint conditions for scenario #9 in accordance with the principles of the disclosure.

Scenario 9: The graph of scenario 9 is depicted in FIG. 11 in which FIG. 11 is the power constraint conditions for scenario #9. This scenario happens when there is no intersection between the tilted line and the curves I-H and I-D. The condition for this scenario and the set of candidates for the power are given by (53) and $P^{(B.3)} = P^{(A.6)}$, respectively.

Weak Cellular Wireless Device ICI and Strong D2D ICI

In this embodiment, the scenario where the ICI channel for the D2D is strong, is considered. However, the ICI channel from cellular wireless device to the neighbouring cell is weak. This case happens if the tilted line forces the maximum D2D power to be less that $P_D^{max}$ and determined by the D2D ICI channel. In this scenario, we have $$\frac{1}{c_2} \leq P_D^{max} \qquad (58)$$

The necessary and sufficient conditions for feasibility of D2D communication are given by (Equation 23) and (Equation 24). The optimum power allocation is given by one of the following scenarios.

Figure 12:
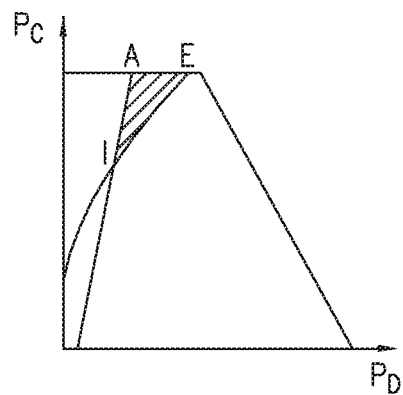
FIG. 12 is a diagram of power constraint conditions for scenario #10 in accordance with the principles of the disclosure.

Scenario 10: The graph of scenario 10 is depicted in FIG. 12 in which FIG. 12 illustrates the power constraint conditions for scenario #10. This scenario happens when there is no intersection between the tilted line and the curves I-E and I-A. The condition for this scenario and the set of candidates for the power are given by (Equation 43) and $P^{(C.1)}=P^{(A.1)}$, respectively.

Figure 13:
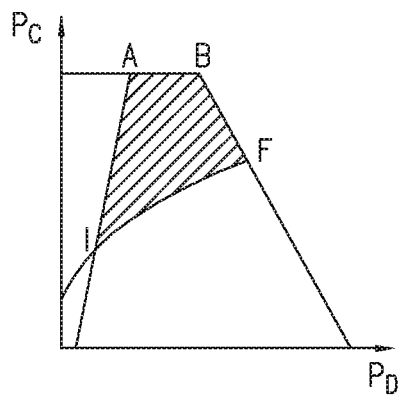
FIG. 13 is a diagram of power constraint conditions for scenario #11 in accordance with the principles of the disclosure.

FIG. 13 shows the graph of scenario 11 in which FIG. 13 illustrates the power constraint conditions for scenario #11. In this scenario, the curve I-F intersects the tilted line, however, I-A has no intersection with the tilted line. The condition for this scenario is as follows $$\frac{1-c_1 P_C^{max}}{c_2} \leq \psi_1 \leq \frac{1}{c_1}, \tag{59}$$

There are three cases for the optimum pair of power. If the cellular wireless device power is its maximum $P_C^{max}$, the optimum point is either point A or B based on Lemma 1. Using Lemma 2, the roots of (Equation 36) that are between the x-coordinates of B and F or the corner points are found. The set of candidates for the power is given by $P^{(C.2)}=P^{(A.2)}$.

Figure 14:
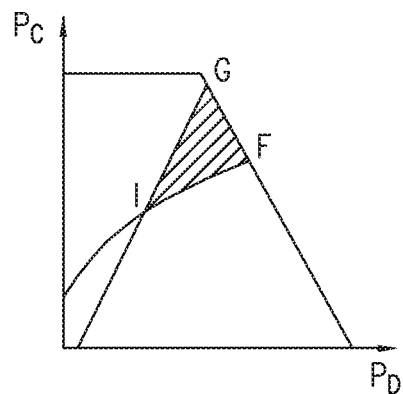
FIG. 14 is a diagram of power constraint conditions for scenario #12 in accordance with the principles of the disclosure.

Scenario 12: FIG. 14 depicts the graph of scenario 12 in which FIG. 14 illustrates the power constraint conditions for scenario #12. In this scenario, both curves I-F and I-G intersect the tilted line. The condition for this scenario is as follows $$\frac{1-c_1 P_C^{max}}{c_2} \leq \psi_2 \leq \psi_1 \leq \frac{1}{c_2}. \tag{60}$$

In order to find the optimum power, the end points G and F need to be considered. In addition, the roots of (Equation 36) that are between the x-coordinates of G and F are obtained. The set of candidates for the power such as the optimum power is given by $P^{(C.3)}=P^{(A.4)}$.

Strong Cellular Wireless Device ICI and Strong D2D ICI

Figure 15:
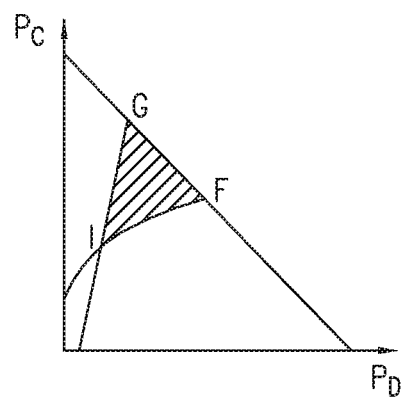
FIG. 15 is a diagram of power constraint conditions for scenario #13 in accordance with the principles of the disclosure.

Scenario 13: In one embodiment, a strong ICI channel for both cellular wireless device and D2D transmitter is considered. This case happens if the tilted line limits the maximum power of both D2D and cellular wireless device such that a triangle is on the power plane. The conditions for this scenario to happen are (Equation 55) and (Equation 58). The necessary and sufficient condition for feasibility of D2D communication is given by (Equation 24). FIG. 15 shows the graph of scenario 13 in which FIG. 15 illustrates the power constraint conditions for scenario #13.

The condition for this scenario can be recast as $$0 \leq \psi_2 \leq \psi_1 \leq \frac{1}{c_2}. \tag{61}$$

The set of candidates for the power such as the optimum power is given by $P^{(D.1)}=P^{(A.4)}$.

Negligible ICI

In the scenario discussed above, the tilted line due to ICI intersects the rectangle made by the maximum power limits on the power limit, i.e. the following has been assumed:

$$\frac{1-c_2 P_D^{max}}{c_1} \leq P_C^{max} \tag{62}$$

$$\frac{1-c_1 P_C^{max}}{c_2} \leq P_D^{max}. \tag{63}$$

Now the assumption is either $$\frac{1-c_2 P_D^{max}}{c_1} > P_C^{max} \text{ or } \frac{1-c_1 P_C^{max}}{c_2} > P_D^{max}.$$

This leads to only the rectangle on the power limit without the tilted line. This happens when the ICI channels to the neighbouring cell are negligible. The necessary and sufficient conditions for feasibility of D2D communication are given by (Equation 22) and (Equation 23). The optimum power allocation is given by one of the following scenarios.

Figure 16:
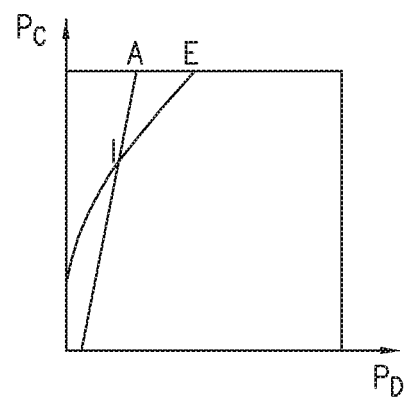
FIG. 16 is a diagram of power constraint conditions for scenario #14 in accordance with the principles of the disclosure.

Scenario 14: The graph of scenario 14 is depicted in FIG. 16 in which FIG. 16 illustrates the power constraint conditions for scenario #14. This scenario happens when the curves I-E and I-A intersect the above side of rectangle. The condition for this scenario is as follows $$K_2\left(\frac{K_1}{1-\frac{\tilde{\gamma}_C}{bP_C^{max}}}-1\right)^{-1} \leq P_D^{max}. \tag{64}$$

According to Lemma 1, it is sufficient to consider only the points A and E to find the optimum power allocation. The set of candidates for the power such as the optimum power is given by $P^{(E.1)}=P^{(A.1)}$.

Figure 17:
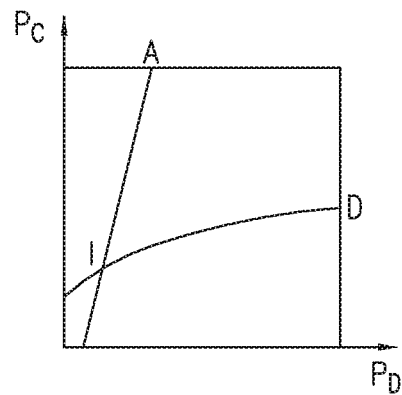
FIG. 17 is a diagram of power constraint conditions for scenario #15 in accordance with the principles of the disclosure.

Scenario 15: The graph of scenario 15 is illustrated in FIG. 17 in which FIG. 17 illustrates the power constraint conditions for scenario #15. In this scenario, the curves I-A and I-D intersect the above and right sides of the rectangle, respectively. The condition for this scenario is given by $$\beta(\sigma_D^2 + K_3 P_C^{max}) \leq P_D^{max}, \tag{65}$$

$$\alpha\left(1-\frac{K_1}{1+K_2/P_D^{max}}\right)^{-1} \leq P_C^{max}. \tag{66}$$

Based on Lemma 1, the optimum power could be given by either of the end points, i.e., $$P^{(E.2)} = \Big\{(\beta(\sigma_D^2 + K_3 P_C^{max}), P_C^{max}), \tag{67}$$

$$(P_D^{max}, P_C^{max}), \left(P_D^{max}, \alpha\left(1-\frac{K_1}{1+K_2/P_D^{max}}\right)^{-1}\right)\Big\}.$$

Figure 18:
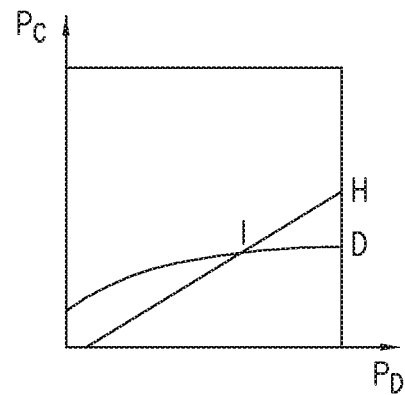
FIG. 18 is a diagram of power constraint conditions for scenario #16 in accordance with the principles of the disclosure.

Scenario 16: The graph of scenario 16 is depicted in FIG. 18 in which FIG. 18 illustrates the power constraint conditions for scenario #16. This scenario happens when the curves I-H and I-D intersect the right side of rectangle. The condition for this scenario is as follows $$\frac{P_D^{max} - \beta\sigma_D^2}{\beta K_3} \le P_C^{max}. \quad (68)$$

According to Lemma 1, it is sufficient to consider only the points H and D to find the optimum power allocation. The set of candidates for the power such as the optimum power is given by $P^{(E.3)} = P^{(A.6)}$.

In another embodiment, with reference to (Equation 4) to (Equation 8) in the embodiment discussed above, if the target other cell interference $P_1$ is not feasible in combination with the target cellular and D2D SINR levels $\gamma_D$ and $\gamma_C$ respectively, the scheduler may iteratively vary for one of these parameters until a feasibility condition is met. For example, the other cell interference target $P_1$ can be iteratively increased with fixed $\gamma_D$ and $\gamma_C$ targets, until a feasibility condition is met. As a second example the eNB scheduler may choose to fix $P_1$ and iteratively decrease $\gamma_D$ and/or $\gamma_C$ targets until a feasibility condition is met.

The method, apparatuses and system described herein provide an arrangement for improve the sum rate or aggregate throughput of simultaneous transmission of D2D users and cellular users under power and interference constraints, as well as QoS requirements, and solving the non-convex power allocation problem and obtaining the solution in closed form. The proposed methods and arrangements disclosed herein outperform known heuristic power allocation algorithms significantly in terms of sum rate and rate gain.

Figure 19:
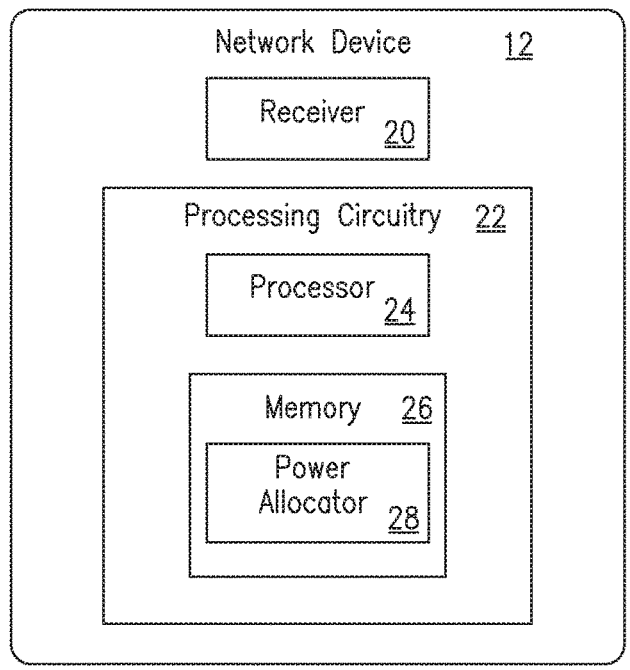
FIG. 19 is a block diagram of a network node in accordance with the principles of the disclosure.

FIG. 19 illustrates an embodiment of network device 12 incorporating the principles of the methods and arrangements disclosed herein. Network device 12 includes a receiver 20 for receiving CSI data for a D2D pair 14, a cellular wireless device 16, and at least one neighbor interference level. Cellular wireless device 16 is configured to have a direct link with a serving network device 12 of a network cell 18 in which the cellular wireless device 16 resides. Network device 12 also includes processing circuitry 22, which, in some embodiments, includes a processor 24 and a memory 26. The memory 26 is in communication with processor 24 and includes instructions that, when executed by the processor 24, configure the processor 24 to perform one or more functions described herein.

In addition to a traditional processor and memory, processing circuitry 22 may comprise integrated circuitry for processing and/or control, e.g., one or more processors and/or processor cores and/or FPGAs (Field Programmable Gate Array) and/or ASICs (Application Specific Integrated Circuitry). Processing circuitry 22 may comprise and/or be connected to and/or be configured for accessing (e.g., writing to and/or reading from) memory 26, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 26 may be configured to store code executable by control circuitry and/or other data, e.g., data pertaining to communication, e.g., configuration and/or address data of nodes, etc.

Processing circuitry 22 may be configured to control any of the methods described herein and/or to cause such methods to be performed, e.g., by the power allocator 28. Power allocator 28 may include its own processing circuitry and associated hardware and software that enable it to perform the power allocation features described herein. Corresponding instructions may be stored in the memory 26, which may be readable and/or readably connected to the processing circuitry 22. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 22 includes or may be connected or connectable to memory 26, which may be configured to be accessible for reading and/or writing by the controller and/or processing circuitry 22.

In one embodiment, processor 24 is configured to determine feasibility conditions for pairing the D2D pair 14 and the cellular wireless device transmissions, determine a power allocation for the pairing of the D2D pair 14 and cellular wireless device transmissions, the power allocation based on a sum rate of the D2D pair 14 and cellular wireless device transmissions, and configure the D2D pair 14 and cellular wireless device 16 based at least in part on the determined power allocation. The determination of the power allocation for the pairing of the D2D pair 14 and cellular wireless device transmissions may be performed by power allocator 28. In one embodiment, processor 24 is further configured to determine a plurality of beam vectors.

In one embodiment, determining the power allocation for the pairing of the D2D pair 14 and cellular wireless device transmissions includes determining a transmission power (Pc) for the cellular wireless device 16 and a transmission power (Pd) for the D2D pair 14.

In one embodiment, the CSI data includes information corresponding to at least one of: a channel response between the D2D pair 14; a channel response between the cellular wireless device 16 and the network device 12; an interference channel between a D2D transmitter and the network device 12; an interference channel between the cellular wireless device 16 and a receiving device of the D2D pair 14; an inter-cell interference (ICI) channel between the D2D pair 14 and a neighbor network device; and an ICI channel between the cellular wireless device 16 and the neighbor base station.

In one embodiment, determining the feasibility conditions for pairing the D2D pair 14 and the cellular wireless device 16 transmissions includes determining whether a predetermined criteria are met when sharing the same Physical Resource Blocks (PRBs) between the cellular wireless device 16 and the D2D pair 14.

In one embodiment, the predetermined criteria includes predefined Signal-to-Noise Ratio (SINR) thresholds for the D2D pair 14 and cellular wireless device 16, and at least one predefined ICI channel threshold.

In one embodiment, memory 26 has further instructions that, when executed by the processor 24, configure the processor 24 to perform additional functions described herein. For example, if it is determined that the feasibility conditions for pairing the D2D pair 14 and the cellular wireless device transmissions are not met, processor 24 is configured to calculate an acceptable level of power over each RB to meet a pre-specified SINR at an interfering cellular wireless device 16 in one of a main cell and a neighboring cell, determining D2D data transmission rates between the D2D pair 14 subject to the calculated maximum acceptable level of power over each RB to meet the pre-specified SINR, and select the interfering cellular wireless device 16 whose RBs are to be shared with the D2D pair 14 based on determined D2D data transmission rates.

In one embodiment, determining the D2D data transmission rates is based on an estimate of a channel of the D2D pair 14.

In one embodiment, memory 26 has further instructions that, when executed by processor 24, configure processor 24 to determine a sum of achievable data rates of the cellular wireless device 16 and the D2D pair 14.

In one embodiment, calculating the acceptable level of power to meet the pre-specified SINR includes constraining a sum of transmission powers of the D2D pair 14 to be less than a maximum power level.

In one embodiment, memory 26 has further instructions that, when executed by processor 24, configure processor 24 to iteratively search for a D2D pair 14 and cellular wireless device 16 pairing that satisfies the feasibility conditions.

Figure 20:
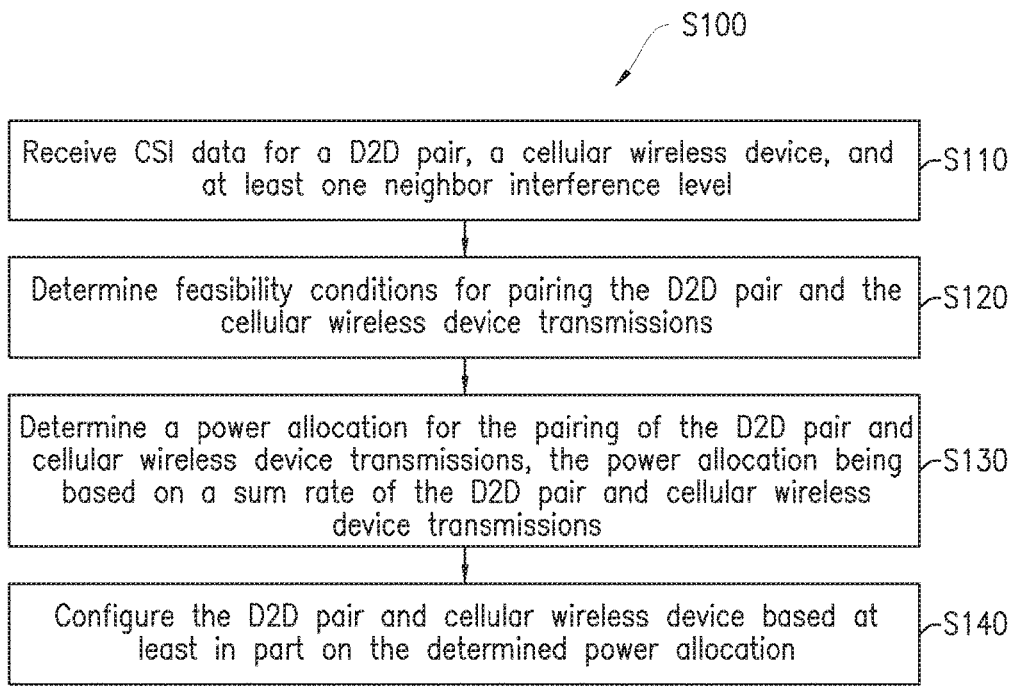
FIG. 20 is a flowchart of the process of power allocation in accordance with the principles of the disclosure.

FIG. 20 is a flowchart depicting an example method (S100) that incorporates an embodiment of the present disclosure. Initially, CSI data for a D2D pair 14, a cellular wireless device 16, and at least one neighbor interference level is received by receiver 20 (Block S110). The cellular wireless device 16 is configured to have a direct link with a serving network device 12 of a network cell 18 in which the cellular wireless device 16 resides. Feasibility conditions for pairing the D2D pair 14 and the cellular wireless device transmissions are determined by processor 24 (Block S120). A power allocator 28 may be configured to determine a power allocation for the pairing of the D2D pair 14 and cellular wireless device transmissions, where the power allocation is based on a sum rate of the D2D pair 14 and cellular wireless device transmissions (Block S130). The D2D pair 14 and cellular wireless device 16 are then configured based at least in part on the determined power allocation (Block S140).

In one embodiment, the method of FIG. 20 further includes determining a plurality of beam vectors at the D2D pair.

In one embodiment, determining the power allocation for the pairing of the D2D pair 14 and cellular wireless device 16 transmissions includes determining a transmission power (Pc) for the cellular wireless device and a transmission power (Pd) for the D2D pair 14.

In one embodiment, the CSI data includes information corresponding to at least one of: a channel response between the D2D pair 14; a channel response between the cellular wireless device 16 and the network device 12; an interference channel between a D2D transmitter and the network device 12; an interference channel between the cellular wireless device 16 and a receiving device of the D2D pair 14; an inter-cell interference (ICI) channel between the D2D pair 14 and a neighbor base station; and an ICI channel between the cellular wireless device 16 and the neighbor base station.

In another embodiment, determining the feasibility conditions for pairing the D2D pair 16 and the cellular wireless device 14 transmissions includes determining whether a predetermined criteria are met when sharing the same Physical Resource Blocks (PRBs) between the cellular wireless device and the D2D pair 14.

In another embodiment, the predetermined criteria include predefined SINR thresholds for the D2D pair 14 and the cellular wireless device 16, and at least one predefined ICI channel threshold.

Figure 21:
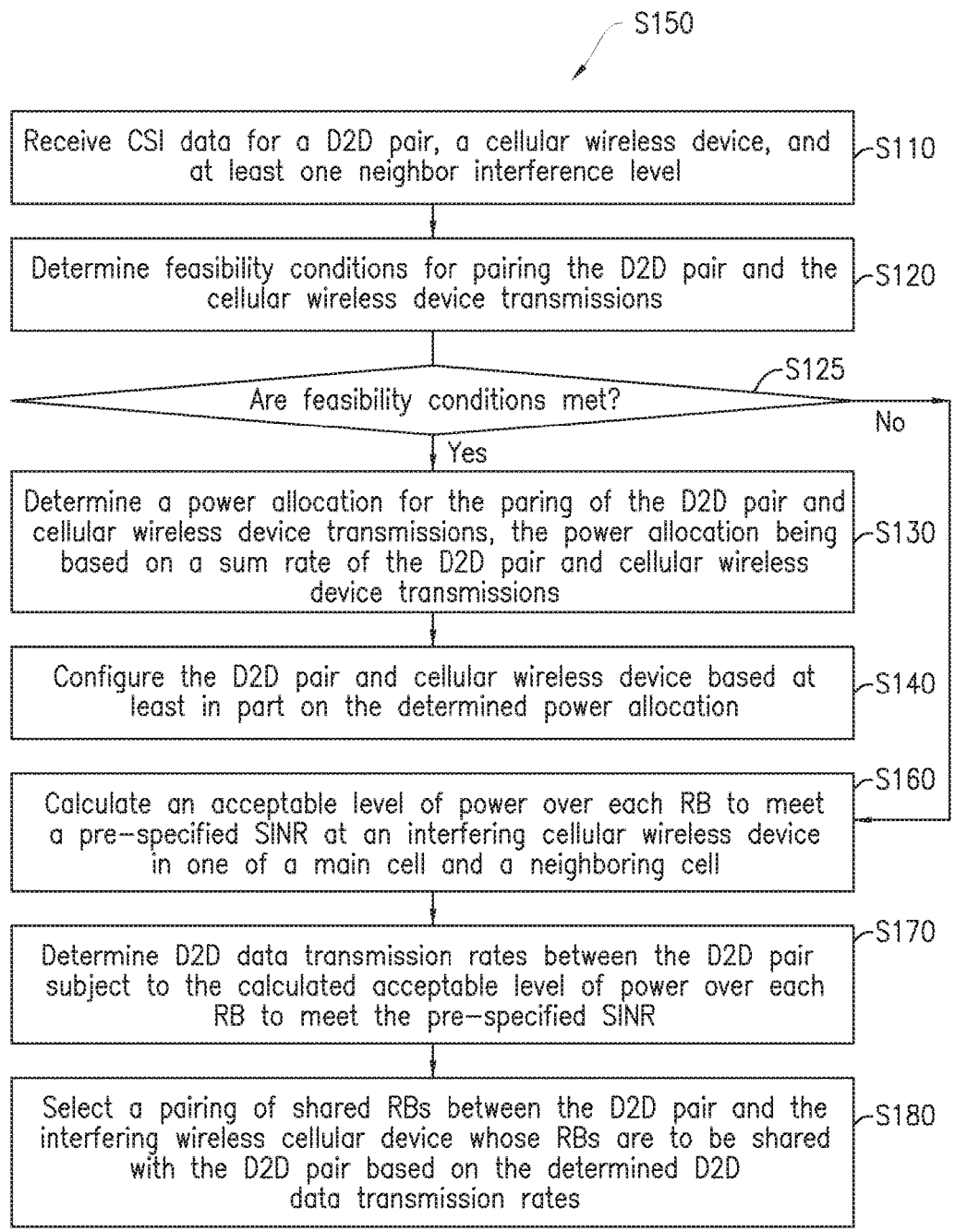
FIG. 21 is a flowchart of a process of power allocation in accordance with an alternate embodiment of the disclosure.

FIG. 21 is a flowchart depicting an example method (S150) that incorporates an alternate embodiment of the present disclosure. As in FIG. 20, initially, CSI data for a D2D pair 14, a cellular wireless device 16, and at least one neighbor interference level is received by receiver 20 (Block S110). Feasibility conditions for pairing the D2D pair 14 and the cellular wireless device transmissions are determined by processor 24 (Block 120). In this embodiment, processor 24 determines if the feasibility conditions are met (Block S125). If the feasibility conditions are met, then, as in FIG. 20, power allocator 28 may be configured to determine a power allocation for the pairing of the D2D pair 14 and cellular wireless device transmissions is, where the power allocation is based on a sum rate of the D2D pair 14 and cellular wireless device transmissions (Block S130) and D2D pair 14 and cellular wireless device 16 are then configured based at least in part on the determined power allocation (Block S140).

However, if the feasibility conditions are not met, then, as described in further detail below, an acceptable level of power over each RB is calculated, to meet a pre-specified SINR at an interfering cellular wireless device 16 in one of a main cell and a neighboring cell (Block S160), D2D data transmission rates between the D2D pair subject to the calculated acceptable level of power over each RB are determined in order to meet the pre-specified SINR (Block S170), and the interfering wireless cellular device whose RBs are to be shared with the D2D pair based on the determined D2D data transmission rates is determined (Block S180). Blocks S160 through S180 may be performed by processor 24 or by one or more of the components of network device 12 depicted in FIG. 23 and discussed in further detail below.

In another embodiment, determining the D2D data transmission rates is based on an estimate of a channel of the D2D pair 14.

In another embodiment, the method further includes determining a sum of achievable data rates of the cellular wireless device 16 and the D2D pair 14.

In another embodiment, calculating the acceptable level of power to meet the pre-specified SINR includes constraining a sum of transmission powers of the D2D pair to be less than a maximum power level.

In another embodiment, the method further includes iteratively searching for a D2D pair 14 and cellular wireless device 16 pairing that satisfies the feasibility conditions.

Figure 22:
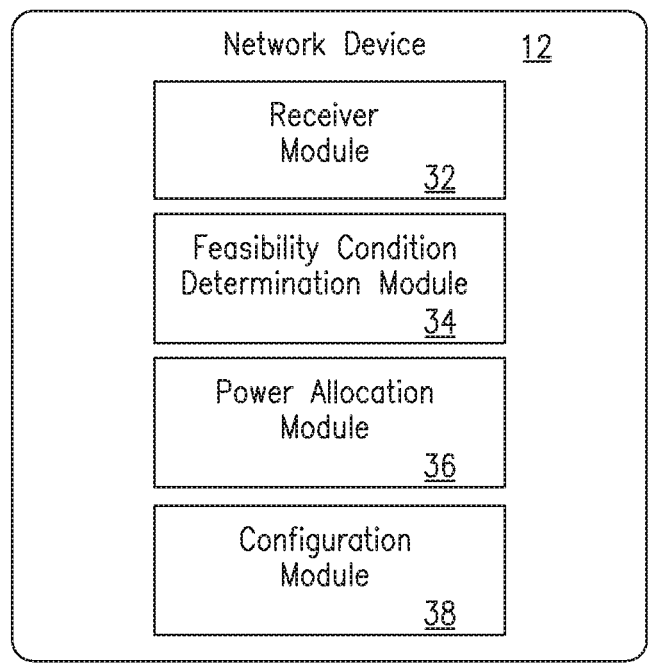
FIG. 22 is an alternate block diagram of a network node in accordance with the principles of the present disclosure.

FIG. 22 illustrates another embodiment of network device 12 incorporating the principles of the present disclosure. Network device 12 includes a receiver module 32 configured to receive CSI data for a D2D pair 14, a cellular wireless device 16, and at least one neighbor interference level. The cellular wireless device 16 is configured to have a direct link with a serving network device 12 of a network cell 18 in which the cellular wireless device resides. A feasibility condition determination module 34 is configured to determine feasibility conditions for pairing the D2D pair 14 and the cellular wireless device transmissions. A power allocation module 36 is configured to determine a power allocation for the pairing of the D2D pair 14 and cellular wireless device 16 transmissions, the power allocation based on a sum rate of the D2D pair 14 and cellular wireless device 16 transmissions. Network device 12 also includes a configuration module configured to configure the D2D pair 14 and cellular wireless device 16 based at least in part on the determined power allocation.

Figure 23:
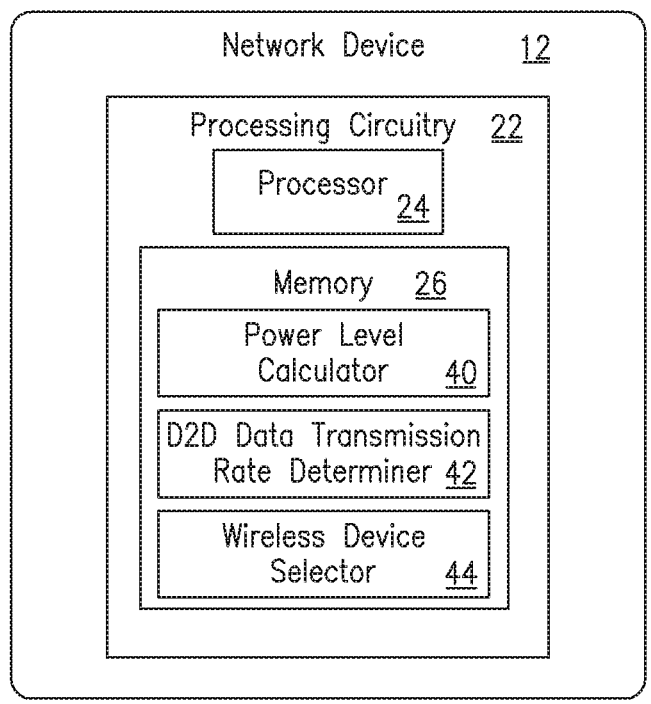
FIG. 23 is yet an alternate block diagram of a network node in accordance with the principles of the present disclosure.

FIG. 23 illustrates another embodiment of a network device 12 incorporating the principles of the present disclosure. As shown in FIG. 23, network device 12 includes processing circuitry 22, which includes processor 24 and memory 26. Processing circuitry 22 may be configured to perform the functions described herein including the functions described in Blocks S160, S170 and S180 of FIG. 21.

In one embodiment, memory 26 may include a power level calculator 40 configured to calculate an acceptable level of power over each RB is calculated, to meet a pre-specified SINR at an interfering cellular wireless device 16 in one of a main cell and a neighboring cell. Memory 26 may also include a D2D transmission rate determiner 42 configured to determine D2D data transmission rates between the D2D pair subject to the calculated acceptable level of power over each RB are determined in order to meet the pre-specified SINR. Memory 26 may also include a cellular wireless device selector 44 configured to select the interfering wireless cellular device whose RBs are to be shared with the D2D pair based on the determined D2D data transmission rates is determined.

In an alternate embodiment, methods and arrangements of the present disclosure provide multiple methods of optimally scheduling a D2D device 14 on resource blocks (RBs) of existing cellular wireless devices 16 in a network that is scheduling both cellular and D2D users. The methods and arrangements disclosed herein assume that each node has access to a number of RBs and consider constraints on the SINR of interfering users in the neighboring cells.

The methods and arrangements disclosed herein do not modify the scheduling of the cellular devices. Thus, the complexity of the optimization arrangement disclosed herein is lower than with existing solutions.

Further, the disclosure herein considers a single antenna-multi RB system while other known methods cover a multi antenna-single RB system. The formulations of the two are totally different.

The methods and arrangements can be applied under the following assumptions:
  An idle D2D pair 14 requests capacity in a network consisting of active cellular and D2D users.
  Due to the localized and low-power transmission of D2D devices 14, the resource planning (resource allocation and power control) of existing users in the network is not modified.
  The new D2D pair 14 will be matched with one of the active cellular users in the network, which means that the D2D pair 14 and the cellular user share all RBs allocated to a selected cellular user.
  It is also assumed that there are N active cellular users (i.e. cellular wireless devices 16) and each cellular device has access to multiple RBs.

The following definitions are employed in the methods and arrangements described herein. $C_i$ is defined as the set of all RBs dedicated to the ith cellular device available to match with the D2D pair 14 and $C \triangleq \cup_{i=1}^{N} C_i$. For the jth RB, $S_j$ is defined as the set of all cellular wireless devices located in the neighboring cells that are employing jth RB.

The notations which are used herein are defined in Table I.

TABLE I

Notation Definition

| | |
|---|---|
| N | The number of cellular users in each cell |
| C | set of all RBs in the network |
| $C_i$ | set of dedicated RBs to the ith cellular user |
| $S_j$ | set of neighboring cellular users accessing to the jth RB |
| $p_{t,j}^D$ | D2D transmitted power over the jth RB |
| $p_{r,j}^C$ | cellular user received power over the jth RB |
| $p_{r,j}^{(k)}$ | neighboring cellular user received power over the jth RB (for $k \in S_j$) |
| $I_j$ | D2D received interference power over the jth RB |

TABLE I-continued

Notation Definition

| | |
|---|---|
| $p_{t,j}^D I_j'$ | cellular user received interference power over the jth RB from the new D2D pair |
| $p_{t,j}^D I_j'^{(k)}$ | neighboring cellular user received interference power over the jth RB (for $k \in S_j$) from new D2D pair |
| $h_j$ | channel coefficent between the two D2D paired users over the jth RB |
| $I_j^0$ | cellular user received interference power over the jth RB before entering the new D2D user |
| $I_j^{0,(k)}$ | neighboring cellular user received interference power over the jth RB (for $k \in S_j$) before entering the new D2D user |
| $P_{max}^D$ | maximum available power for a D2D pair |
| $\zeta_{j,min}^{intra}$ | cellular user minimum required SINR over the jth RB |
| $\zeta_{j,min}^{(k)}$ | neighboring cellular user minimum required SINR over the jth RB (for $k \in S_j$) |
| $\sigma^2$ | noise power over each RB |

Note: Define $[x]_a^b = \begin{cases} a & x < a \\ x & a \leq x \leq b \\ b & x > b \end{cases}$ Pseudo Code for Implementing D2D Rate Maximization Algorithm In the D2D rate maximization method the following steps are employed:

1. For each channel realization, using the channel state information from all interfering devices, calculate the maximum acceptable level of power over each RB to guarantee some pre-specified level of SINR for any interfering cellular wireless device 16 in the main cell and neighboring cells.
2. The optimal power allocation for each RB is found such that the achievable D2D rate is maximized satisfying constraints on the sum-power of the D2D device 14 and also the SINR of the interfering cellular wireless devices 16 in the main cell and neighboring cells.
3. Based on calculated achievable rates, find the best cellular match:

Step 1.
For l=1 to N do
For all $j \in C_l$, calculate $$\eta_j \triangleq \min\left\{ \frac{p_{r,j}^C / \zeta_{j,min}^{intra} - (\sigma^2 + I_j^0)}{I_j'}, \left\{ \frac{p_{r,j}^{(k)} / \zeta_{j,min}^{(k)} - (\sigma^2 + I_j^{0,(k)})}{I_j'^{(k)}} \right\}^A_{k \in S_j} \right\}$$

If $\Sigma_{j \in C_l} \eta_j \leq P_{max}$ then
For all $j \in C_l$, set $p_{t,j}^D = \eta_j$.
Else
Using the bisection method, find $p_{t,j}^D$ and $\lambda > 0$ such that $\Sigma_{j \in C_l} p_{t,j}^D = P_{max}^D$ and $$p_{t,j}^D = \left[ \frac{1}{\lambda} - \frac{\sigma^2 + I_j}{|h_j|^2} \right]_0^{\eta_j}$$

end if
Calculate $$R_l = \sum_{j \in C_l} \log\left(1 + \frac{|h_j|^2 p_{t,j}^D}{\sigma^2 + I_j}\right).$$

end for

Step 2. Find the best cellular wireless device for the D2D 14 pair to match, using $$l^* = \underset{l}{\operatorname{argmax}} R_l.$$

Pseudo Code for Implementing Sum-Rate Maximization Algorithm:

In the D2D and cellular aggregate sum rate maximization method, the following steps are employed:
1. For each channel realization, using the channel state information from all interfering devices, calculate the maximum acceptable level of power over each RB to guarantee a pre-specified level of SINR for any interfering cellular wireless device 16 in the main cell and neighboring cells.
2. Find the optimal power allocation for each RB such that the achievable sum-rate is maximized satisfying constraints on the sum-power of the D2D device 14 and also the SINR of the interfering cellular wireless devices 16 in the main cell and neighboring cells.
3. Based on calculated achievable rates, find the best cellular match.

Step 1.
For l=1 to N do
For al $j \in C_l$, calculate:

$$\eta_j \triangleq \min\left\{ \frac{p_{r,j}^C / \zeta_{j,min}^{intra} - (\sigma^2 + I_j^0)}{I'_j}\bigg|_A, \left\{\frac{p_{r,j}^{(k)} / \zeta_{j,min}^{(k)} - (\sigma^2 + I_j^{0,(k)})}{I_j^{\prime(k)}}\bigg|_A\right\}_{k \in S_j}\right\}.$$

$a_j \triangleq (\sigma^2 + I_j^0)(\sigma^2 + I_j)$, $b_j \triangleq (\sigma^2 + I_j^0)|h_j|^2$, $c_j \triangleq (\sigma^2 + I_j)I'_j$.

$\kappa_j \triangleq \frac{b_j c_j}{a_j^2}$, $\beta_j \triangleq \frac{b_j + c_j}{a_j}$ and $\gamma_j \triangleq \frac{b_j - c_j}{a_j}$.

Define $C'_l = \{j \in C_l | b_j > c_j\}$.
If $\Sigma_{j \in C'_l} \eta_j \leq P_{max}^D$ then
For all $j \in C'_l$, set $p_{t,j}^D = \eta_j$.
For all $j \in C_l \setminus C'_l$, set $p_{t,j}^D = 0$.
else
Using the bisection method, find $p_{t,j}^D$ and $\lambda > 0$ such that $\Sigma_{j \in C_l} p_{t,j}^D = P_{max}^D$ and $$p_{t,j}^D = \left[\frac{-\beta_j + \sqrt{\beta_j^2 - 4\kappa_j\left(1 - \frac{\gamma_j}{\lambda}\right)}}{2\kappa_j}\right]_0^{\eta_j}.$$

end if
Calculate $$R_l^{improv} = \sum_{j \in C_l} \log\left(\frac{a_j + b_j p_{t,j}^D}{a_j + c_j p_{t,j}^D}\right).$$

end for

Step 2. Find the best cellular user for the D2D pair to match, using $$l^* \underset{l}{\operatorname{argmax}} R_l^{improv} A.$$

Detailed Formulation and Solution

D2D Rate Maximization

This section provides the details of the derivation of determining the optimal cellular device to match with a given D2D pair, as well as the corresponding optimal resource allocation for the new D2D pair, in order to maximize the D2D pair's achievable rate. The effects of all interfering D2D device located in the neighboring cells are considered. The same method can be applied for each newly accepted D2D pair in any cell. Based on the notation in Table 1, the optimization problem can be formulated as follows:

$$\max_{\{p_{t,j}^D\} \geq 0, \alpha} \sum_{i=1}^{N} \sum_{j \in C_i} \alpha_i \log\left(1 + \frac{|h_j|^2 p_{t,j}^D}{\sigma^2 + I_j}\right) \alpha_i \in \{0, 1\}, \quad (69a)$$

$i = 1, 2, \ldots, N$ $$\sum_{i=1}^{N} \alpha_i \leq 1, \quad (69b)$$

$$\sum_{i=1}^{N} \sum_{j \in C_i} \alpha_i p_{t,j}^D \leq P_{max}^D \quad (69c)$$

$$\frac{p_{r,j}^C}{\sigma^2 + I_j^0 + \alpha_i p_{t,j}^D I'_j} \geq \zeta_{j,min}^{intra}, \, j \in C_i, \, i = 1, 2, \ldots, N \quad (69d)$$

$$\frac{p_{r,j}^{(k)}}{\sigma^2 + I_j^{0,(k)} + \alpha_i p_{t,j}^D I_j^{\prime(k)}} \geq \zeta_{j,min}^{(k)}, \, j \in C_i, \, k \in S_j, \quad (69e)$$

$i = 1, 2, \ldots, N$.

where $\alpha$ is an all-zero vector except for one of its elements which is set to 1, $p_{t,j}^D$ is the D2D pair transmitted power, $p_{r,j}^C$ is the received power of the ith cellular device, $p_{r,j}^{(k)}$ is the received power of the kth device over the jth RB where $j \in C_i$ and $k \in S_j$ (note that as per Table 1, $S_j$ is defined as set of all devices in the neighboring cells which use the jth RB), $h_j$ is the D2D channel coefficient over the jth RB (for the new D2D user), $I_j$ is the received interference power from all interfering devices to the new D2D device and $\sigma^2$ is noise power which is assumed to be the same over all RB's. In the above, $I'_j$ and $I_j^{\prime(k)}$ are defined such that $p_{t,j}^D I'_j$ and $p_{i,j}^D I_j^{\prime(k)}$ are the received interference power from the new D2D device for the cellular device which uses the jth RB and for the kth neighboring cellular device ($k \in S_j$), respectively.

Furthermore, $I_j^0$ and $I_j^{0,(k)}$ are the interference power the cellular device which uses the jth RB and the kth neighboring cellular device ($k \in S_j$) receive before entering the new D2D device, respectively. The constraints in (69d)-(69e) specify the minimum QoS requirement of the cellular devices in the main cell over the jth RB and also for the neighboring cellular devices which belong to $S_j$. These two constraints can be simplified to $\alpha_i p_{t,j}^D \leq \eta_j$ where:

$$\eta_j \stackrel{\Delta}{=} \min\left\{ \left\lfloor \frac{\frac{p_{r,j}^C}{\zeta_{j,min}^{intra}} - (\sigma^2 + I_j^0)}{I_j'} \right\rfloor_A^A, \left\{ \left\lfloor \frac{\frac{p_{r,j}^{(k)}}{\zeta_{j,min}^{(k)}} - (\sigma^2 + I_j^{0,(k)})}{I_j'^{(k)}} \right\rfloor_A^A \right\} k \in S_j \right\}. \quad (70)$$

Now assume that the lth cellular user is the solution for the matching problem. The resource allocation problem will be as follows:

$$\max_{\{p_{t,j}^D\}} \sum_{j \in C_l} \log\left(1 + \frac{|h_j|^2 p_{t,j}^D}{\sigma^2 + I_j}\right) \quad (71a)$$

subject to $\sum_{j \in C_l} p_{t,j}^D \leq P_{max}^D$ $$0 \leq p_{t,j}^D \leq \eta_j, \, j \in C_l. \quad (71b)$$

To solve (3), considering that the utility function in (71) is an increasing function of $p_{t,j}^D$, there are two different cases. First, if $\Sigma_{j \in C_l} \eta_j \leq P_{max}^D$, then $p_{t,j}^D = \eta_j$, for all $j \in C_l$, will be the optimal solution. It can be determined that it satisfies all the constraints in (71). Second, if $\Sigma_{j \in C_l} \eta_j > P_{max}^D$, then the total power constraint (1c) must be satisfied with equality (otherwise it will be possible to increase some $P_{t,j}^D$'s without violating the constraints which leads to an increase in the objective function). In this case, the optimization problem in (71) can be rewritten as $$\max_{\{p_{t,j}^D\}} \sum_{j \in C_l} \log\left(1 + \frac{|h_j|^2 p_{t,j}^D}{\sigma^2 + I_j}\right) \quad (72a)$$

subject to $\sum_{j \in C_l} p_{t,j}^D = P_{max}^D$ $$0 \leq p_{t,j}^D \leq \eta_j, \, j \in C_l. \quad (72b)$$

To solve (72), the Karush-Kuhn-Tucker (KKT) optimality condition can be used. It can be shown that, for all $j \in C_l$, the solution for the optimization problem is:

$$p_{t,j}^D = \left[\frac{1}{\lambda} - \frac{\sigma^2 + I_j}{|h_j|^2}\right]_0^{\eta_j}, \quad (73)$$

where $\lambda > 0$ should be found such that $\Sigma_{j \in C_l} p_{t,j}^D = P_{max}^D$. Because $p_j$ is a decreasing function of $\lambda$, the bisection method can be used to efficiently find the optimal $\lambda$.

If the new D2D pair is matched with the lth cellular user, the achievable rate for the new D2D pair will be $$R_l = \sum_{j \in C_l} \log\left(1 + \frac{|h_j|^2 p_{t,j}^D}{\sigma^2 + I_j}\right). \quad (74)$$

After solving (71), for all $l \in \{1, 2, \ldots, N\}$, the D2D pair is matched with the l*th cellular device, where $$l^* = \arg\max_l R_l.$$

Sum-Rate Maximization

In this embodiment, the optimal cellular device to match with the new D2D pair is derived, as well as the corresponding optimal resource allocation for the new D2D pair, in order to maximize the sum-rate between the matched cellular wireless device and D2D pair. The optimization problem can be formulated as follows:

$$\max_{\{p_{t,j}^D\} \geq 0, \alpha} \sum_{i=1}^N \sum_{j \in C_i} \left[\log\left(1 + \frac{p_{r,j}^C}{\sigma^2 + I_j^0 + \alpha_i p_{t,j}^D I_j'}\right) + \alpha_i \log\left(1 + \frac{|h_j|^2 p_{t,j}^D}{\sigma^2 + I_j}\right)\right] \quad (75a)$$

subject to $\alpha_i \in \{0, 1\}, i = 1, 2, \ldots, N$ $$\sum_{i=1}^N \alpha_i \leq 1, \quad (75b)$$

$$\sum_{i=1}^N \sum_{j \in C_i} \alpha_i p_{t,j}^D \leq P_{max}^D \quad (75c)$$

$$\frac{p_{r,j}^C}{\sigma^2 + I_j^0 + \alpha_i p_{t,j}^D I_j'} \geq \zeta_{j,min}^{intra}, \, j \in C_i, i = 1, 2, \ldots, N \quad (75d)$$

$$\frac{p_{r,j}^{(k)}}{\sigma^2 + I_j^{0,(k)} + \alpha_i p_{t,j}^D I_j'^{(k)}} \geq \zeta_{j,min}^{intra}, \, j \in C_i, k \in S_j, \quad (75e)$$

$i = 1, 2, \ldots, N.$

By subtracting the fixed value of the cell sum-rate before entering the new D2D pair, i.e., $\sum_{i=1}^N \sum_{j \in C_i} \log\left(1 + \frac{p_{r,j}^C}{\sigma^2 + I_j^0}\right)$, the objective function can be converted to sum-rate improvement due to entering the new D2D pair. Therefore, the above optimization problem is equivalent to $$\max_{\{p_{t,j}^D\} \geq 0, \alpha} \sum_{i=1}^N \sum_{j \in C_i} \left[\log\left(1 + \frac{p_{r,j}^C}{\sigma^2 + I_j^0 + \alpha_i p_{t,j}^D I_j'}\right) - \log\left(1 + \frac{p_{r,j}^C}{\sigma^2 + I_j^0}\right) + \alpha_i \log\left(1 + \frac{|h_j|^2 p_{t,j}^D}{\sigma^2 + I_j}\right)\right] \quad (76a)$$

subject to $\alpha_i \in \{0, 1\}, i = 1, 2, \ldots, N$ $$\sum_{i=1}^N \alpha_i \leq 1, \quad (76b)$$

$$\sum_{i=1}^N \sum_{j \in C_i} \alpha_i p_{t,j}^D \leq P_{max}^D \quad (76c)$$

$$\frac{p_{r,j}^C}{\sigma^2 + I_j^0 + \alpha_i p_{t,j}^D I_j'} \geq \zeta_{j,min}^{intra}, \, j \in C_i, i = 1, 2, \ldots, N \quad (76d)$$

$$\frac{p_{r,j}^{(k)}}{\sigma^2 + I_j^{0,(k)} + \alpha_i p_{t,j}^D I_j'^{(k)}} \geq \zeta_{j,min}^{intra}, \; j \in C_i, k \in S_j, \quad (76e)$$

$$i = 1, 2, \ldots, N.$$

By assuming $\zeta_{j,min}^{intra} \gg 1$, for all $j \in C_i$ and $i=1,2,\ldots,N$, the objective of the above optimization problem can be approximated as follows:

$$U(\{p_{t,j}^D\}, \alpha) \triangleq \qquad (77)$$

$$\sum_{i=1}^{N} \sum_{j \in C_i} \left[ \log\left(1 + \frac{p_{r,j}^C}{\sigma^2 + I_j^0 + \alpha_i p_{t,j}^D I_j'}\right) - \log\left(1 + \frac{p_{r,j}^C}{\sigma^2 + I_j^0}\right) + \alpha_i \log\left(1 + \frac{|h_j|^2 p_{t,j}^D}{\sigma^2 + I_j}\right) \right] \approx$$

$$\sum_{i=1}^{N} \sum_{j \in C_i} \left[ \log\left(\frac{p_{r,j}^C}{\sigma^2 + I_j^0 + \alpha_i p_{t,j}^D I_j'}\right) - \log\left(\frac{p_{r,j}^C}{\sigma^2 + I_j^0}\right) + \alpha_i \log\left(1 + \frac{|h_j|^2 p_{t,j}^D}{\sigma^2 + I_j}\right) \right] =$$

$$\sum_{i=1}^{N} \sum_{j \in C_i} \left[ \alpha_i \log\left(1 + \frac{|h_j|^2 p_{t,j}^D}{\sigma^2 + I_j}\right) - \log\left(1 + \frac{\alpha_i p_{t,j}^D I_j'}{\sigma^2 + I_j^0}\right) \right] =$$

$$\sum_{i=1}^{N} \sum_{j \in C_i} \alpha_i \log\left(\frac{(\sigma^2 + I_j^0)(\sigma^2 + I_j) + (\sigma^2 + I_j^0)|h_j|^2 p_{t,j}^D}{(\sigma^2 + I_j^0)(\sigma^2 + I_j) + (\sigma^2 + I_j)I_j' p_{t,j}^D}\right).$$

Thus:

$$U(\{p_{t,j}^D\}, \alpha_l) = \sum_{j \in C_l} \log\left(\frac{(\sigma^2 + I_j^0)(\sigma^2 + I_j) + (\sigma^2 + I_j^0)|h_j|^2 p_{t,j}^D}{(\sigma^2 + I_j^0)(\sigma^2 + I_j) + (\sigma^2 I_j)I_j' p_{t,j}^D}\right) \quad (78)$$

$$= \sum_{j \in C_l} \log\left(\frac{a_j + b_j p_{t,j}^D}{a_j + c_j p_{t,j}^D}\right).$$

where $\alpha_l$ is an all-zero vector except for the lth element which is set to 1, and the following definition applies, $a_j \triangleq (\sigma^2 + I_j^0)(\sigma^2 + I_j)$, $b_j \triangleq (\sigma^2 + I_j^0)|h_j|^2$, and $c_j \triangleq (\sigma^2 + I_j)I_j'$. Assuming that the lth cellular device is the solution for the matching problem. The resource allocation problem will be as follows:

$$\max_{\{p_{t,j}^D\}} \sum_{j \in C_l} \log\left(\frac{a_j + b_j p_{t,j}^D}{a_j + c_j p_{t,j}^D}\right) \quad (79a)$$

subject to $\sum_{j \in C_l} p_{t,j}^D \leq P_{max}^D$ $$0 \leq p_{t,j}^D \leq \eta_j, \; j \in C_l. \quad (79b)$$

Note that the function $$\log\left(\frac{a_j + b_j p_{t,j}^D}{a_j + c_j p_{t,j}^D}\right),$$

for $b_j \leq c_j$, is a decreasing function, and for $b_j > c_j$, it is a strictly increasing function. Hence, if $b_j \leq c_j$, there is no benefit in injecting any power to the corresponding RB because it will decrease the utility function, so that $p_{t,j}^D = 0$ at optimality. Thus, defining $C'_l = \{j \in C_l | b_j > c_j\}$, only finding the power allocation for $j \in C'_l$ is needed. Therefore, the optimization problem in (79) can be rewritten as:

$$\max_{\{p_{t,j}^D\}} \sum_{j \in C'_l} \log\left(\frac{a_j + b_j p_{t,j}^D}{a_j + c_j p_{t,j}^D}\right) \quad (80a)$$

subject to $\sum_{j \in C'_l} p_{t,j}^D \leq P_{max}^D$ $$0 \leq p_{t,j}^D \leq \eta_j, \; j \in C'_l. \quad (80b)$$

To solve (80), there are two different cases. If $\Sigma_{j \in C_l} \eta_j \leq P_{max}^D$, then $p_{t,j}^D = \eta_j$, for all $j \in C_l$, is the optimal solution. It is easy to check that it satisfies all the constraints in (80). If $\Sigma_{j \in C'_l} \eta_j > P_{max}^D$, then the total power constraint must be satisfied with equality (otherwise it will be possible to increase some $p_{t,j}^D$'s without violating the constraints which leads to an increase in the objective function). In this case, (80) can be rewritten as:

$$\max_{\{p_{t,j}^D\}} \sum_{j \in C'_l} \log\left(\frac{a_j + b_j p_{t,j}^D}{a_j + c_j p_{t,j}^D}\right) \quad (81a)$$

subject to $\sum_{j \in C'_l} p_{t,j}^D \leq P_{max}^D$ $$0 \leq p_{t,j}^D \leq \eta_j, \; j \in C'_l. \quad (81b)$$

It can be shown that $$\log\left(\frac{a_j + b_j p_{t,j}^D}{a_j + c_j p_{t,j}^D}\right)$$

is a strictly increasing and concave function of $p_{t,j}^D$ if and only if $b_j > c_j$. Considering the definition of the set $C'_l$, the KKT optimality condition can be used to solve (81). The following Lagrangian is defined:

$$\mathcal{L}(\{p_{t,j}^D\}, \{\lambda_{1j}\}, \{\lambda_{2j}\}, \lambda) \triangleq -\sum_{j \in C'_l} \log\left(\frac{a_j + b_j p_{t,j}^D}{a_j + c_j p_{t,j}^D}\right) + \quad (82)$$

$$\sum_{j \in C'_l} \lambda_{1j}(p_{t,j}^D - \eta_j) - \sum_{j \in C'_l} \lambda_{2j} p_{t,j}^D + \lambda\left(\sum_{j \in C'_l} p_{t,j}^D - P_{max}^D\right).$$

Then, the KKT optimality condition can be written as follows:

$$\frac{a_j b_j - a_j c_j}{(a_j + b_j p_{t,j}^D)(a_j + c_j p_{t,j}^D)} + \lambda_{1j} - \lambda_{2j} - \lambda = 0, \ j \in C_l', \quad (83a)$$

$$\sum_{j \in C_l'} p_{t,j}^D = P_{max}^D, \quad (83b)$$

$$0 \leq p_{t,j}^D \leq \eta_j, \ j \in C_l', \quad (83c)$$

$$\lambda_{1j}(p_{t,j}^D - \eta_j) = 0, \ j \in C_l', \quad (83d)$$

$$\lambda_{2j} p_{t,j}^D = 0, \ j \in C_l', \quad (83e)$$

$$\{\lambda_{1j}\} \geq 0, \{\lambda_{2j}\} \geq 0. \quad (83f)$$

There are three different cases:
Case 1) $\zeta_{1j} > 0$ and $\lambda_{2j} = 0$: in this case $p_{t,j}^D = \eta_j$.
Case 2) $\lambda_{1j} = 0$ and $\lambda_{2j} > 0$: in this case $p_{t,j}^D = 0$.
Case 3) $\zeta_{1j} = 0$ and $\lambda_{2j} = 0$: in this case $\lambda b_j c_j (p_{t,j}^D)^2 + \lambda a_j (b_j + c_j) p_{t,j}^D + (\lambda a_j^2 - a_j b_j + a_j c_j) = 0$ or equivalently $$\kappa_j (p_{t,j}^D)^2 + \beta_j p_{t,j}^D + \left(1 - \frac{\gamma_j}{\lambda}\right) = 0 \text{ where}$$

$$\kappa_j \triangleq \frac{b_j c_j}{a_j^2} > 0, \beta_j \triangleq \frac{b_j + c_j}{a_j} > 0, \text{ and } \gamma_j \triangleq \frac{b_j - c_j}{a_j} > 0.$$

The summation of the roots of this equation is $$-\frac{\beta_j}{\kappa_j},$$

which is a non-negative value so there is at least one negative root. Only the greater root can be positive, which is $$p_{t,j}^D = \frac{-\beta_j + \sqrt{\beta_j^2 - 4\kappa_j\left(1 - \frac{\gamma_j}{\lambda}\right)}}{2\kappa_j}. \quad (84)$$

This root is positive if and only if $0 < \lambda < \gamma_j$. Hence, from Cases 1-3, for all $j \in C_l$, the optimal power allocation is written as $$p_{t,j}^D = \left[\frac{-\beta_j + \sqrt{\beta_j^2 - 4\kappa_j\left(1 - \frac{\gamma_j}{\lambda}\right)}}{2\kappa_j}\right]_0^{\eta_j}. \quad (85)$$

where $\lambda > 0$ should be found such that we have $\Sigma_{j \in C_l} p_{t,j}^D = P_{max}^D$. The optimal $\lambda$ can be found by searching over $(0, \max \gamma_j)$. Because $p_{t,j}^D$ is a decreasing function of $\lambda$, then the bisection method can be used to efficiently find the optimal $\lambda$.

If the new D2D pair is matched with the lth cellular cellular wireless device, the achievable rate for the new D2D pair will be $$R_l^{improv} = \sum_{j \in C_l} \log\left(\frac{a_j + b_j p_{t,j}^D}{a_j + c_j p_{t,j}^D}\right). \quad (86)$$

After solving (3), for all $l \in \{1,2,\ldots,N\}$, the D2D pair is matched with the l*th cellular user, where $$l^* = \underset{l}{\operatorname{argmax}} R_l^{improv} A.$$

In accordance with some embodiments of the disclosure:
Both uplink and downlink resource sharing are considered at the same time.

The resource allocation problem for a D2D pair is solved without changing the resource allocation for other devices. Therefore, the proposed solutions have substantial reduction in computational complexity compared with an optimal solution that considers joint resource allocation for the D2D pair D2D pair and the other devices in the cell. Yet, due to the localized and low-power nature of D2D communication, the performance of the other devices is not substantially impacted.

The proposed solution for the D2D maximization problem is optimal and the proposed solution for the sum-rate maximization problem is asymptotically optimal under high SINR, i.e., the higher SINR, the closer solution to the optimal value.

The computation complexity of the proposed algorithm is low. The optimum powers and scheduled RBs are obtained essentially in closed-form. The algorithm can be implemented in a base station scheduler due to its simplicity.

FIG. 23 illustrates network device 12 according to another embodiment of the present disclosure. In this embodiment, network device 12 may be a base station that has been modified to implement the features described herein. In one embodiment, if it is determined by processor 24 that the feasibility conditions for pairing the D2D pair and the cellular wireless device transmissions are not met, then power level calculator 40 of network device 12 is configured to calculate an acceptable level of power over each RB in order to meet a pre-specified SINR at an interfering cellular wireless device in one of a main cell and a neighboring cell. These calculations are performed by power level calculator 40 and may be performed in a manner consistent with equations (1d) and (1e) or (7d) and (7e) or (8d) and (8e).

D2D data transmission rate determiner 42 is configured to determine D2D data transmission rates between the D2D pair subject to the calculated acceptable level of power over each RB to meet the pre-specified SINR. This determination is performed by D2D data transmission rate determiner 42 in a manner consistent with equations (1a) and (1b) or (7a) and (7b) or (8a) and (8b). Cellular wireless device selector 44 is configured to select the interfering wireless cellular device whose RBs are to be shared with the D2D pair based on the determined D2D data transmission rates.

In a further embodiment, determining the D2D data transmission rates is based on an estimate of a channel of the D2D pair. In a further embodiment, a sum of achievable data rates of the cellular wireless device and the D2D pair is determined by processor 24. In a further embodiment, calculating the acceptable level of power to meet the pre-specified SINR includes constraining a sum of transmission powers of the D2D pair to be less than a maximum power level and may be performed in a manner consistent with equation (1c) or (7c) or (8c).

Although the disclosure describes implementing the process using a processor and a memory, embodiments are not limited to such. It is contemplated that embodiments performing the functions and calculations can be implemented using programmable gate arrays (PGAs), application specific integrated circuits (ASICs), and the like. Further, although embodiments are described using a base station, it is contemplated that the process steps can be performed in other network nodes and even distributed across multiple network nodes.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for configuring a device-to-device, D2D, pair and a cellular wireless device, the cellular wireless device configured to have a direct link with a serving network device of a network cell in which the cellular wireless device resides, the method performed by the serving network device comprising:
receiving Channel State Information, CSI, data for the D2D pair, the cellular wireless device, and at least one neighbor interference level;
determining feasibility conditions for pairing the D2D pair and the cellular wireless device transmissions;
determining a power allocation for the pairing of the D2D pair and cellular wireless device transmissions, the power allocation being based on a sum rate of the D2D pair and cellular wireless device transmissions; and
configuring the D2D pair and cellular wireless device based at least in part on the determined power allocation,
wherein if it is determined that the feasibility conditions for pairing the D2D pair and the cellular wireless device transmissions are not met:
calculating an acceptable level of power over each resource block, RB, to meet a pre-specified signal to noise-plus-interference ratio, SINR, at an interfering cellular wireless device in one of a main cell and a neighboring cell;

determining D2D data transmission rates between the D2D pair subject to the calculated acceptable level of power over each RB to meet the pre-specified SINR; and selecting a pairing of shared RBs between the D2D pair and the interfering wireless cellular device whose RBs are to be shared with the D2D pair based on the determined D2D data transmission rates.

2. The method of claim 1, further comprising determining a plurality of beam vectors at the D2D pair.

3. The method of claim 1, wherein determining the power allocation for the pairing of the D2D pair and cellular wireless device transmissions includes determining a transmission power, Pc, for the cellular wireless device and a transmission power, Pd, for the D2D pair.

4. The method of claim 1, wherein the CSI data includes information corresponding to at least one of:
a channel response between the D2D pair; a channel response between the cellular wireless device and the network device;
an interference channel between a D2D transmitter and the network device;
an interference channel between the cellular wireless device and a receiving device of the D2D pair;
an inter-cell interference, ICI, channel between the D2D pair and a neighbor base station; and
an inter-cell interference, ICI, channel between the cellular wireless device and the neighbor base station.

5. The method of claim 1, wherein determining the feasibility conditions for pairing the D2D pair and the cellular wireless device transmissions includes determining whether a predetermined criteria are met when sharing the same Physical Resource Blocks, PRBs, between the cellular wireless device and the D2D pair.

6. The method of claim 5, wherein the predetermined criteria includes:
predefined Signal-to-Noise Ratio, SINR, thresholds for the D2D pair and the cellular wireless device; and
at least one predefined ICI channel threshold.

7. The method of claim 1, wherein determining the D2D data transmission rates is based on an estimate of a channel of the D2D pair.

8. The method of claim 1, further comprising:
determining a sum of achievable data rates of the cellular wireless device and the D2D pair.

9. The method of claim 1, wherein calculating the acceptable level of power to meet the pre-specified SINR includes constraining a sum of transmission powers of the D2D pair to be less than a maximum power level.

10. The method of claim 1, further comprising iteratively searching for a D2D pair and cellular wireless device pairing that satisfies the feasibility conditions.

11. A network device for configuring a device-to-device, D2D, pair and a cellular wireless device, the cellular wireless device configured to have a direct link with a serving network device of a network cell in which the cellular wireless device resides, the network device comprising:
a receiver configured to receive Channel State Information, CSI, data for the D2D pair, the cellular wireless device, and at least one neighbor interference level; and
processing circuitry comprising:
a memory; and
a processor, the memory in communication with the processor, the memory having instructions that, when executed by the processor, configure the processor to:

determine feasibility conditions for pairing the D2D pair and the cellular wireless device transmissions;
determine a power allocation for the pairing of the D2D pair and cellular wireless device transmissions, the power allocation based on a sum rate of the D2D pair and cellular wireless device transmissions; and
configure the D2D pair and cellular wireless device based at least in part on the determined power allocation,
wherein if it is determined that the feasibility conditions for pairing the D2D pair and the cellular wireless device transmissions are not met:
calculate an acceptable level of power over each resource block, RB, to meet a pre-specified signal to noise-plus-interference ratio, SINR, at an interfering cellular wireless device in one of a main cell and a neighboring cell;
determine D2D data transmission rates between the D2D pair subject to the calculated maximum acceptable level of power over each RB to meet the pre-specified SINR; and
select a pairing of shared RBs between the D2D pair and the interfering cellular wireless device whose RBs are to be shared with the D2D pair based on determined D2D data transmission rates.

12. The network device of claim 11, the processor further configured to determine a plurality of beam vectors at the D2D pair.

13. The network device of claim 11, wherein determining the power allocation for the pairing of the D2D pair and cellular wireless device transmissions includes determining a transmission power, Pc, for the cellular wireless device and a transmission power, Pd, for the D2D pair.

14. The network device of claim 11, wherein the CSI data includes information corresponding to at least one of:
a channel response between the D2D pair;
a channel response between the cellular wireless device and the network device;
an interference channel between a D2D transmitter and the network device;
an interference channel between the cellular wireless device and a receiving device of the D2D pair;
an inter-cell interference, ICI, channel between the D2D pair and a neighbor base station; and
an inter-cell interference, ICI, channel between the cellular wireless device and the neighbor base station.

15. The network device of claim 11, wherein determining the feasibility conditions for pairing the D2D pair and the cellular wireless device transmissions includes determining whether a predetermined criteria are met when sharing the same Physical Resource Blocks, PRBs, between the cellular wireless device and the D2D pair.

16. The network device of claim 15, wherein the predetermined criteria includes:
predefined Signal-to-Noise Ratio, SINR, thresholds for the D2D pair and cellular wireless device; and
at least one predefined ICI channel threshold.

17. The network device of claim 11, wherein determining a D2D data transmission rates is based on an estimate of a channel of the D2D pair.

18. The network device of claim 11, wherein the memory has further instructions that, when executed by the processor, configure the processor to determine a sum of achievable data rates of the cellular wireless device and the D2D pair.

19. The network device of claim 11, wherein calculating an acceptable level of power to meet the pre-specified SINR includes constraining a sum of transmission powers of the D2D pair to be less than a maximum power level.

20. The network device of claim 11, wherein the memory has further instructions that, when executed by the processor, configure the processor to iteratively search for a D2D pair and cellular wireless device pairing that satisfies the feasibility conditions.

21. A network device for configuring a device-to-device, D2D, pair and a cellular wireless device, the cellular wireless device configured to have a direct link with a serving network device of a network cell in which the cellular wireless device resides, the network device comprising:
- a receiver circuitry configured to receive Channel State Information, CSI, data for the D2D pair, the cellular wireless device, and at least one neighbor interference level;
- a feasibility condition determination circuitry configured to determine feasibility conditions for pairing the D2D pair and the cellular wireless device transmissions;
- a power allocation circuitry configured to determine a power allocation for the pairing of the D2D pair and cellular wireless device transmissions, the power allocation based on a sum rate of the D2D pair and cellular wireless device transmissions; and
- a configuration circuitry configured to configure the D2D pair and cellular wireless device based at least in part on the determined power allocation,
  - wherein if it is determined that the feasibility conditions for pairing the D2D pair and the cellular wireless device transmissions are not met:
    - calculating an acceptable level of power over each resource block, RB, to meet a pre-specified signal to noise-plus-interference ratio, SINR, at an interfering cellular wireless device in one of a main cell and a neighboring cell;
    - determining D2D data transmission rates between the D2D pair subject to the calculated acceptable level of power over each RB to meet the pre-specified SINR; and
    - selecting a pairing of shared RBs between the D2D pair and the interfering wireless cellular device whose RBs are to be shared with the D2D pair based on the determined D2D data transmission rates.

* * * * *